(12) United States Patent
Sasaki

(10) Patent No.: US 7,983,123 B2
(45) Date of Patent: *Jul. 19, 2011

(54) METHODS OF DEFECT MANAGEMENT AND REPRODUCTION, PROGRAM AND RECORDING MEDIUM, AND APPARATUSES FOR INFORMATION RECORDING AND INFORMATION REPRODUCTION

(75) Inventor: Yoshiyuki Sasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1898 days.

This patent is subject to a terminal disclaimer.

(21) Appl. No.: 11/074,068

(22) Filed: Mar. 8, 2005

(65) Prior Publication Data

US 2005/0201237 A1 Sep. 15, 2005

(30) Foreign Application Priority Data

Mar. 11, 2004 (JP) ................................. 2004-068431
Apr. 5, 2004 (JP) ................................. 2004-110698

(51) Int. Cl.
*G11B 7/00* (2006.01)

(52) U.S. Cl. ................ 369/47.14; 369/53.16; 369/53.17

(58) Field of Classification Search ............... 369/47.14, 369/53.16, 53.17
See application file for complete search history.

(56) References Cited

U.S. PATENT DOCUMENTS

| 6,711,106 | B2 | 3/2004 | Sasaki | |
| 6,788,642 | B2 * | 9/2004 | Hirotsune et al. | 369/275.3 |
| 6,918,003 | B2 | 7/2005 | Sasaki | |
| 7,596,063 | B2 * | 9/2009 | Sasaki | 369/47.14 |
| 2002/0114245 | A1 | 8/2002 | Sasaki | |
| 2002/0159353 | A1 | 10/2002 | Sasaki | |
| 2003/0033475 | A1 | 2/2003 | Sasaki | |
| 2003/0133369 | A1 | 7/2003 | Sasaki | |
| 2003/0223327 | A1 * | 12/2003 | Lee et al. | 369/47.14 |
| 2003/0223338 | A1 | 12/2003 | Sasaki | |
| 2004/0057366 | A1 | 3/2004 | Sasaki | |
| 2004/0090886 | A1 | 5/2004 | Sasaki | |
| 2004/0133739 | A1 | 7/2004 | Sasaki | |
| 2004/0160875 | A1 | 8/2004 | Sasaki | |
| 2004/0165499 | A1 | 8/2004 | Sasaki | |
| 2004/0174782 | A1 * | 9/2004 | Lee et al. | 369/47.14 |
| 2004/0213117 | A1 | 10/2004 | Sasaki | |
| 2004/0246863 | A1 * | 12/2004 | Ando et al. | 369/59.22 |
| 2005/0030852 | A1 | 2/2005 | Sasaki | |

(Continued)

FOREIGN PATENT DOCUMENTS

JP 2000-322835 11/2000

*Primary Examiner* — Wayne R Young
*Assistant Examiner* — Dionne H Pendleton
(74) *Attorney, Agent, or Firm* — Dickstein Shapiro LLP

(57) ABSTRACT

A method of defect management for managing on a block-by-block basis a defective area in an information-recording medium is disclosed. The medium has a user-data area, a sparing area, and a defect-management information are. The block is of a predetermined size. The method includes the steps of, when a defective block in which the defective area is included is set to be replaced with a sparing block of the sparing area: dividing the sparing block into multiple subblocks so as to set identifying information, for identifying a sparing subblock in which data are replaced and a non-sparing subblock in which data are not replaced, as defect-management information; and setting block-management information, including information regarding the defective block and the sparing block, and information regarding an area in which non-sparing data not replaced with the sparing block are stored, as defect-management information.

36 Claims, 17 Drawing Sheets

U.S. PATENT DOCUMENTS

| | | |
|---|---|---|
| 2005/0030873 A1 | 2/2005 | Sasaki |
| 2005/0030874 A1 | 2/2005 | Sasaki |
| 2005/0036422 A1 | 2/2005 | Sasaki |
| 2005/0195710 A1* | 9/2005 | Koda et al. ................. 369/47.14 |

* cited by examiner

FIG.4A

| STATE | DEFECTIVE-BLICK ADDRESS | RESERVED | SPARING-BLOCK ADDRESS | BIT MAP | PBN OF PREVIOUS REPLACEMENT BLOCK |
|---|---|---|---|---|---|

FIG.4B

| STATE 1 | STATE 2 | CONTENTS |
|---|---|---|
| 0000b | 00xxb | INDICATES VALID SPARING LIST. DATA REPLACING BEING PERFORMED |
| 0001b | 0000b | INDICATES VALID SPARING LIST. DATA REPLACING NOT BEING PERFORMED |
| 0010b | 0000b | INDICATES UNUSED SPARING LIST |
| 0011b | 0000b | INDICATES DEFECTIVE SPARING LIST |
| OTHERS | OTHERS | RESERVED |

| STATE 2 | CONTENTS |
|---|---|
| 00x0b | INDICATES THE SAME DATA BEING RECORDED IN DEFECTIVE BLOCK AND SPARING BLOCK |
| 00x1b | INDICATES DIFFERENT DATA BEING RECORDED IN DEFECTIVE BLOCK AND SPARING BLOCK |
| 000xb | DEFECTIVE BLOCK HAS ALL SECTOR DATA REPLACED |
| 001xb | DEFECTIVE BLOCK HAS DATA REPLACED PARTIALLY |
| OTHERS | RESERVED |

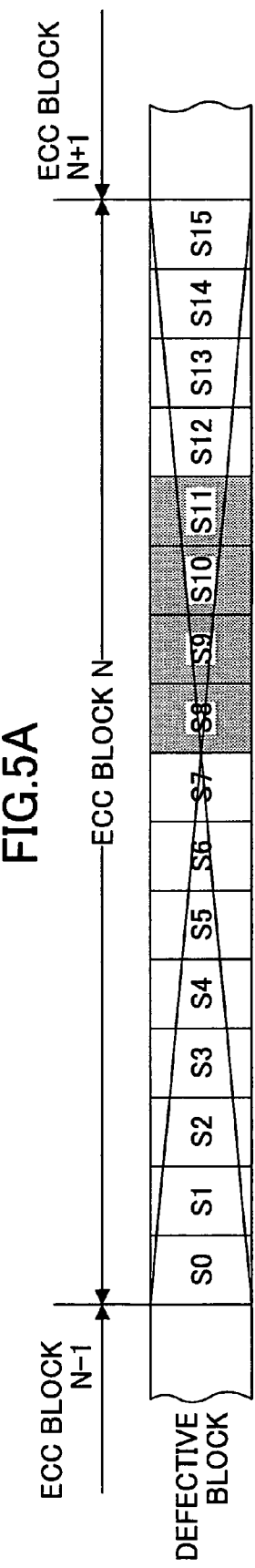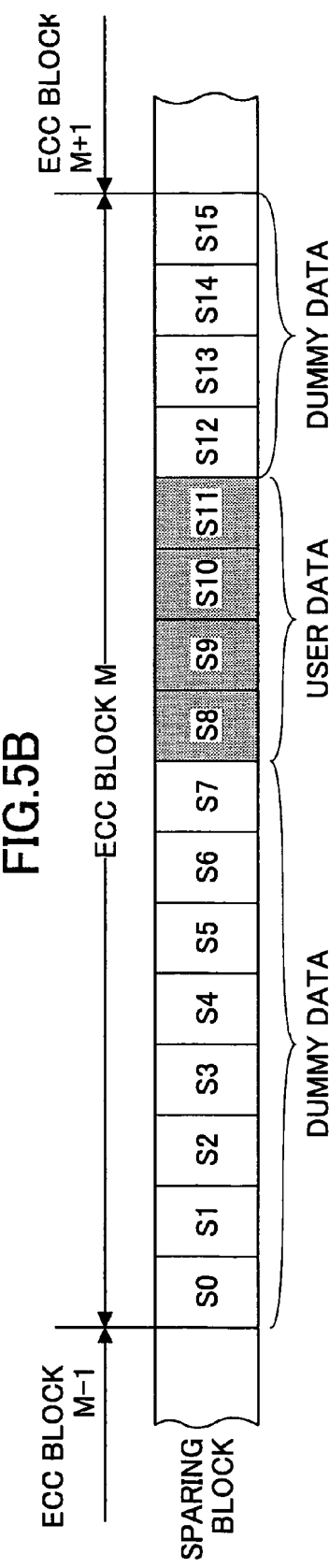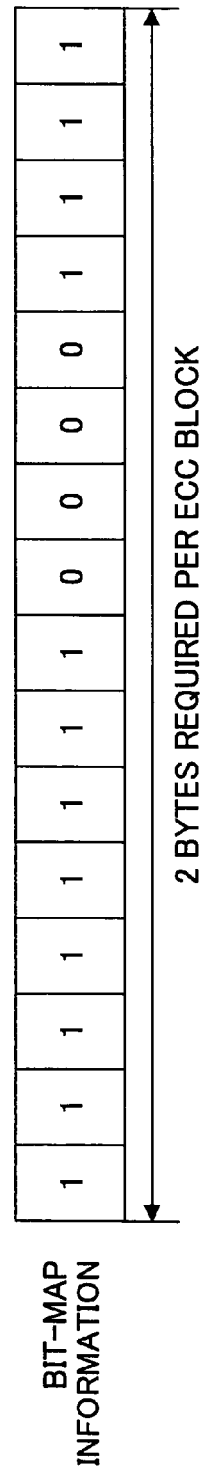

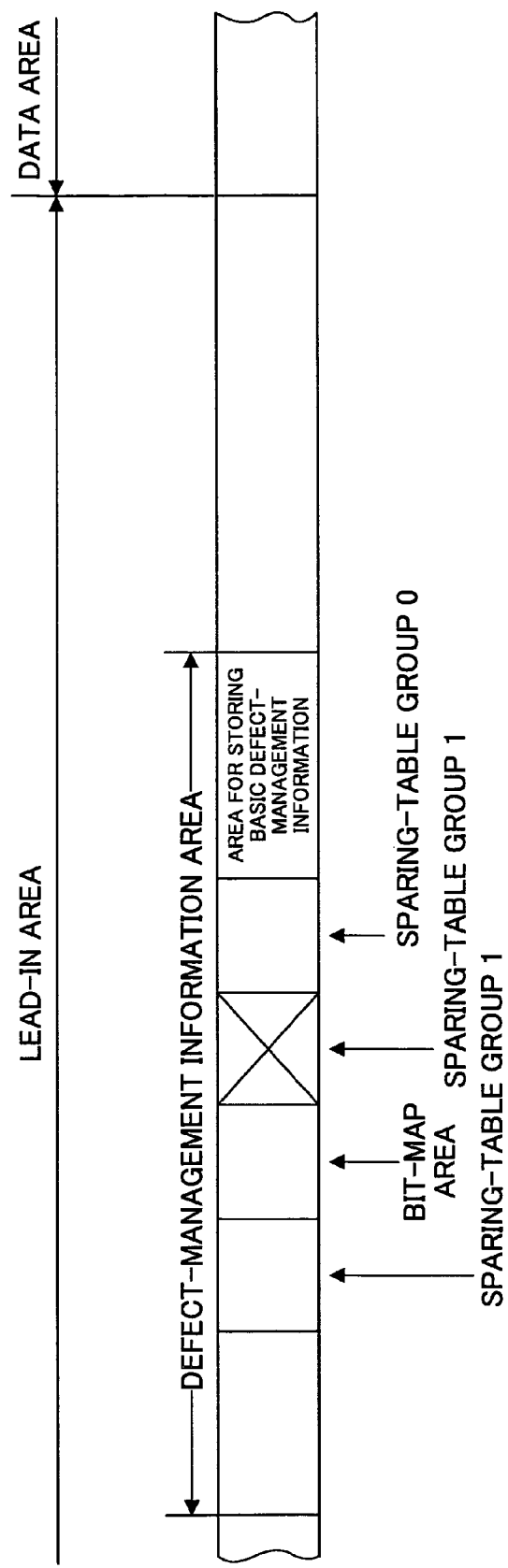

FIG.8C

| CONTENTS | BYTES |
|---|---|
| IDENTIFYING ID | 3 |
| VERSION NUMBER | 1 |
| UPDATE COUNT | 4 |
| SA1 SIZE | 2 |
| SA2 SIZE | 2 |
| NUMBER OF SPARING-TABLE GROUPS | 1 |
| POSITION INFORMATION ON SPARING -TABLE GROUP 0 | 3 |
| POSITION INFORMATION ON SPARING -TABLE GROUP 1 | 3 |
| POSITION INFORMATION ON BIT-MAP AREA | 3 |
| SA2 BYTE-OFFSET INFORMATION | 2 |
| BIT-MAP SIZE | 2 |
| RESERVED | |

FIG.9

| STATE 1 | STATE 2 | CONTENTS |
|---|---|---|
| 0000b | 0xxxb | INDICATES VALID SPARING LIST. DATA REPLACING BEING PERFORMED |
| 0001b | 0000b | INDICATES VALID SPARING LIST. DATA REPLACING NOT BEING PERFORMED |
| 0010b | 0000b | INDICATES UNUSED SPARING LIST |
| 0011b | 0000b | INDICATES DEFECTIVE SPARING LIST |
| OTHERS | OTHERS | RESERVED |

| STATE 2 | CONTENTS |
|---|---|
| 0xx0b | INDICATES THE SAME DATA BEING RECORDED IN DEFECTIVE BLOCK AND SPARING BLOCK |
| 0xx1b | INDICATES DIFFERENT DATA BEING RECORDED IN DEFECTIVE BLOCK AND SPARING BLOCK |
| 000xb | DEFECTIVE BLOCK HAS ALL SECTOR DATA REPLACED |
| 001xb | DEFECTIVE BLOCK HAS DATA PARTIALLY REPLACED, AREA INCLUDING DATA OF UNREPLACED PORTION BELONGING TO UDA |
| 010xb | DEFECTIVE BLOCK HAS DATA PARTIALLY REPLACED, AREA INCLUDING DATA OF UNREPLACED PORTION BELONGING TO SA |
| 011xb | DEFECTIVE BLOCK HAS DATA PARTIALLY REPLACED, AREA INCLUDING DATA OF UNREPLACED PORTION NOT ABLE TO BE SPECIFIED |
| OTHERS | RESERVED |

FIG.12

| STATE 2 | CONTENTS |
|---|---|
| 0xx0b | INDICATES THE SAME DATA BEING RECORDED IN DEFECTIVE BLOCK AND SPARING BLOCK |
| 0xx1b | INDICATES DIFFERENT DATA BEING RECORDED IN DEFECTIVE BLOCK AND SPARING BLOCK |
| 0x0xb | DEFECTIVE BLOCK HAS ALL SECTOR DATA REPLACED |
| 0x1xb | DEFECTIVE BLOCK HAS DATA PARTIALLY REPLACED |
| 00xxb | AREA INCLUDING DATA OF UNREPLACED PORTION CORRESPONDS TO DEFECTIVE BLOCK |
| 01xxb | AREA INCLUDING DATA OF UNREPLACED PORTION DOES NOT CORRESPOND TO DEFECTIVE BLOCK |
| OTHERS | RESERVED |

※THE SECOND MOST-SIGNIFICANT BIT IS VALID ONLY WHEN
THE THIRD MOST-SIGNIFICANT BIT IS ONE(1)

FIG.16A

| CONTENTS | BYTES |
|---|---|
| IDENTIFYING ID | 3 |
| VERSION NUMBER | 1 |
| UPDATE COUNT | 4 |
| SA1 SIZE | 2 |
| PARTIAL-UDA SIZE | 2 |
| SA2 SIZE | 2 |
| NUMBER OF SPARING-TABLE GROUPS | 1 |
| POSITION INFORMATION ON SPARING-TABLE GROUP 0 | 3 |
| POSITION INFORMATION ON SPARING-TABLE GROUP 1 | 3 |
| RESERVED | |

FIG.16B

| CONTENTS | BYTES |
|---|---|
| IDENTIFYING ID | 3 |
| SPARING-LIST TABLE NUMBER | 1 |
| UPDATE COUNT | 4 |
| NUMBER OF SPARING LISTS | 2 |
| POINTER FOR STORING UNUSED SPARING LIST | 2 |
| POINTER FOR STORING DEFECTIVE SPARING LIST | 2 |
| DEFECT BLOCK ADDRESS 1 | 3 |
| DEFECT BLOCK ADDRESS 2 | 3 |
| UNUSED SPARING BLOCK ADDRESS 1 | 3 |
| UNUSED SPARING BLOCK ADDRESS 2 | 3 |
| BIT-MAP POSITION INFORMATION | 3 |
| BIT-MAP SIZE | 2 |
| BIT-MAP BLOCK ADDRESS | 2 |
| SPARING LIST 1 | 6 |
| ... | ... |
| SPARING LIST n | 6 |
| RESERVED | |

METHODS OF DEFECT MANAGEMENT AND REPRODUCTION, PROGRAM AND RECORDING MEDIUM, AND APPARATUSES FOR INFORMATION RECORDING AND INFORMATION REPRODUCTION

TECHNICAL FIELD

The present invention generally relates to a technology for recording and reproducing information, and more particularly to a defect-management method for managing defective areas in an information-recording medium, a reproduction method for reproducing data from the information-recording medium, a program for use in an information-recording apparatus and an information-reproducing apparatus and a recording medium in which the program is stored, an information-recording apparatus for recording data in the information-recording medium, and an information-reproducing apparatus for reproducing data from the information-recording medium.

BACKGROUND ART

As an information-recording medium for recording data, optical disks such as a CD (Compact Disc) and a DVD (Digital-Versatile Disc) have captured attention, and as an information-recording apparatus for recording data into the optical disk and as an information-reproducing apparatus for reproducing data from the optical disk, the optical-disk apparatus has proliferated.

There are such recordable CDs as CD-R and CD-RW, while there are such recordable DVDs as DVD–R, DVD+R, DVD–RW, DVD+RW and DVD-RAM. Then, data are recorded to and reproduced from the respective media according to the corresponding standards which are predetermined.

Of such information-recording media as described above, in a rewritable information-recording medium, defect management is applied conventionally as a way of maintaining the reliability of recorded data. In such defect management as described above, a list associating a defective portion of the recording medium with an area to be used in lieu of this defective portion is stored in a predetermined sparing area of the information-recording medium so that the list as described above is referred to at a subsequent time of recording and reproducing information, thus controlling so as to avoid the use of the defective portion.

Next, a method of replacing a defective area according to the defect management is briefly described. Two types of replacing of the defective area in the defect management, slip sparing and linear sparing, are generally used. In the slip sparing, when a defective area is detected, an area subsequent to the defective area is used in lieu of the defective area. Then, when the slip sparing takes place, a logical address associated with data and a physical address indicating a position of the area are to respectively slip by 1. In the linear sparing, when a defective area is detected, a sparing area secured in advance at a location physically remote from the defective area is used. It is noted that, in the linear sparing, as the subject of replacing is located physically remote from the defective area, it may take longer to access relative to the slip sparing. For instance, in the DVD-RAM, the slip sparing is applied to a defect (an initial or primary defect) detected in an initializing process (a formatting process) of the disk, while the linear sparing is applied to a defect (a secondary defect) detected during recording of user data after the initializing process. In other words, in the DVD-RAM, both the slip sparing and the linear sparing are used. Then, defect information on the initial defects is registered in a Primary Defect List, "PDL"), while defect information on the secondary defects is registered in a Secondary Defect List, "SDL"). In the DVD+RW, only the linear sparing is applied.

In the DVD+RW standard and the DVD-RAM standard, the user can request to record data per sector. However, when actually recording into the optical disk, the recording is done per a recording block of a predetermined size, called an ECC block. Now, the ECC block is composed from a user-data area consisting of 16 sectors. Therefore, when there is a request from a user to record on a sector-by-sector basis, a process is performed such that data of the ECC block that occupy recorded sectors requested are first read out from the optical disk after which the occupying data are overwritten with the data requested to be recorded so as to write back data on a recorded-block by recorded-block basis. This is called a Read-Modify-Write process.

In the DVD-RAM and the DVD+RW, for a secondary defect (the defect during the recording of the user data), data sparing is performed per ECC block. Therefore, a sparing list for managing defects also exists per ECC block. In other words, even when only some sectors within the ECC block have defects, all data of the ECC block are replaced. This is because, in the DVD, as data-error correcting is typically performed per ECC block, there is a high likelihood that, when there is a defective sector within the ECC block, data of other sectors within the ECC block cannot be read out.

Thus, in the Read-Modify-Write process as described above, there is an inconvenience that, when an error takes place at the time of reading out the ECC block so that the data of the ECC block cannot be read out, as not all of the data within the ECC block are being maintained, the ECC block cannot be replaced. Even when only data of sectors for which there is a request from a user for recording are replaced, there can be no choice but to record dummy data in a sector other than recorded sectors requested, for the ECC block for which such data are replaced. When there is a request from a user to reproduce a sector in which dummy data are recorded, erroneous data are returned to the user.

When trying to provide for a sparing list on a sector-by-sector basis, for example, in order to deal with such inconvenience as described above, a sparing list having a size 16 times (1 ECC block=16 sectors) relative to a conventional method for managing defect per ECC block is required, also requiring a large-sized memory capacity for maintaining the defect-management information. Moreover, as described above, when there is a defective sector within the ECC block, as there is a high likelihood that data of other sectors within the ECC block also cannot be read out, replacing is eventually performed per ECC block so that, taking into account the memory capacity, etc., there are more disadvantages than advantages in maintaining a defect list on a sector-by-sector basis.

Now, an apparatus is proposed that takes into account whether there is data sparing so as to manage defects in an information-recording medium (refer to Patent Document 1, for example.) The apparatus disclosed in the Patent Document 1 is an apparatus that sets, when replacing a defective area, flag information indicating whether data are replaced so that the flag information is referred to when reproducing such that, when reproducing area in which data are not replaced is requested, a corresponding defective area is reproduced. However, even with this apparatus, when there is a request for recording on a sector-by-sector basis but the ECC block including the sectors requested for recording cannot be read out, the requested data cannot be replaced.

Patent Document 1

JP2000-322835A

DISCLOSURE OF THE INVENTION

Accordingly, it is a general object of the present invention to provide a technology for recording and reproducing information that substantially obviates one or more problems caused by the limitations and disadvantages of the related art.

It is a more particular object of the present invention to provide a defect-management method for managing defective areas, a reproduction method for reproducing data from an information-recording medium, a program for use in an information-recording apparatus and the information-reproducing apparatus and a recording medium in which the program is stored, an information-recording apparatus for recording data in the information-recording medium, and an information-reproducing apparatus for reproducing data from the information-recording medium.

According to the invention, a method of defect management for managing on a block-by-block basis a defective area in an information-recording medium having a user-data area, a sparing area, and a defect-management information area, the block being of a predetermined size, includes the steps of, when a defective block in which the defective area is included is set to be replaced with a sparing block of said sparing area: dividing the sparing block into multiple subblocks so as to set identifying information, for identifying a sparing subblock in which data are replaced and a non-sparing subblock in which data are not replaced, as defect-management information; and setting block-management information, including information regarding the defective block and the sparing block, and information regarding an area in which non-sparing data not replaced with the sparing block are stored as defect-management information.

According to another aspect of the invention, the apparatus for information recording for recording data in an information-recording medium having a user-data area, a sparing area, and a defect-management information area, a defective area being managed on a block-by-block basis, the block being of a predetermined size, includes replacing means for replacing a defective block in which the defective area is included, with a sparing block of the sparing area, identifying-information setting means for dividing the sparing block into multiple subblocks so as to set identifying information, for identifying a sparing subblock in which data are replaced and a non-sparing subblock in which data are not replaced, as defect-management information; and management-information setting means for setting block-management information, including information regarding the defective block and the sparing block, and information regarding an area in which non-sparing data not replaced with the sparing block are stored, as defect-management information.

BRIEF DESCRIPTION OF THE DRAWINGS

Other objects, features, and advantages of the present invention will become more apparent from the following detailed description when read in conjunction with the accompanying drawings, in which:

FIG. 4A is a diagram for describing a sparing list in a first embodiment of the present invention;

FIG. 4B is another diagram for describing the sparing list in the first embodiment of the present invention;

FIG. 5A is a diagram for describing bit-map information in FIG. 4A;

FIG. 5B is another diagram for describing the bit-map information in FIG. 4A;

FIG. 5C is yet another diagram for describing the bit-map information in FIG. 4A;

FIG. 8A is a diagram for describing a sparing list in a second embodiment of the present invention;

FIG. 8B is a diagram for describing a bit-map area in the second embodiment of the present invention;

FIG. 8C is a diagram for describing bit-map area information in the second embodiment of the present invention;

FIG. 9 is a diagram for describing state information in the second embodiment;

FIG. 12 is a diagram for describing state information in a variation 1 of the second embodiment;

FIG. 16A is a second part of the figure for describing the variation 2 of the second embodiment; and FIG. 16B is another second part of the figure for describing the variation 2 of the second embodiment.

BEST MODE FOR CARRYING OUT THE INVENTION

First Embodiment

Figure 1:
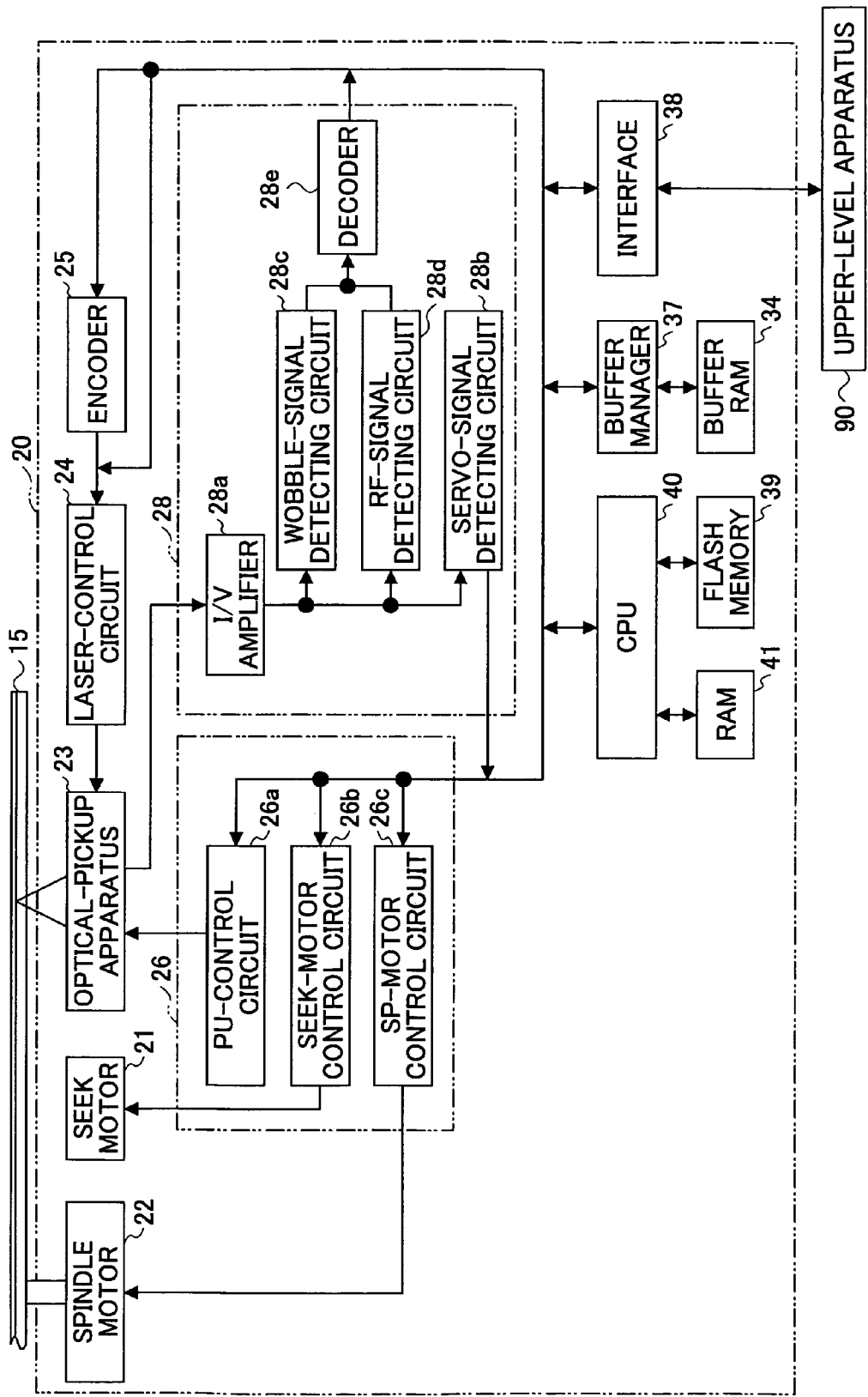
FIG. 1 is a block diagram illustrating a configuration of an optical-disk apparatus in a first embodiment of the present invention.

Below, a first embodiment of the present invention is described based on FIGS. 1 through 7. In FIG. 1 is illustrated a general configuration of an optical-disk apparatus 20 as an information-recording apparatus and an information-reproducing apparatus in the first embodiment of the present invention.

The optical-disk apparatus 20 as illustrated in FIG. 1 comprises a spindle motor 22 for rotationally driving an optical disk 15 as an information-recording medium, an optical-pickup apparatus 23, a seek motor 21 for driving the optical-pickup apparatus 23 in the direction of the sledge, a laser-control circuit 24, an encoder 25, a servo-control circuit 26, a reproducing-signal processing-circuit 28, a buffer RAM 34, a buffer manager 37, an interface 38, a flash memory 39, a CPU 40 and a RAM 41, etc. It is noted that arrows in FIG. 1 indicating representative signals and information flow do not show all of the connecting relationships between blocks.

Moreover, in the present first embodiment, it is assumed that a DVD+RW, as an example, is used for the optical disk 15.

The optical-pickup apparatus 23 as described above is an apparatus for irradiating a laser light-beam onto a recording surface of the optical disk 15 on which spiral-shaped or concentric-shaped tracks are formed as well as for detecting a light-beam reflected from the recording surface. This optical-pickup apparatus 23 is configured to include an optical system including a semiconductor laser and an object lens for directing a luminous flux output from the semiconductor laser onto the recording surface of the optical disk 15 as well as for directing a return luminous-flux reflected at the recording surface as described above to a predetermined detecting position, a photodetector arranged at the detecting position for detecting the return luminous-flux, and a driving system (a focusing actuator and a tracking actuator) (both figures omitted), etc. Then, from the photodetector a signal dependent on the detected amount is output to the reproducing-signal processing circuit 28.

The reproducing-signal processing circuit 28 as described above is composed of an I/V amplifier 28a, a servo-signal detecting circuit 28b, a wobble-signal detecting circuit 28c, a RF-signal detecting circuit 28d, and a decoder 28e, etc. The I/V amplifier 28a converts the output signal of the photodetector constituting the optical-pickup apparatus 23 as described above to a voltage signal and also amplifies the converted voltage signal at a predetermined gain. The servo-signal detecting circuit 28b detects a servo signal such as a focusing-error signal or a tracking-error signal, etc., based on the output signal of the I/V amplifier 28a. Such detected servo signal as described above is output to the servo-control circuit 26 as described above. The wobble-signal detecting circuit 28c as described above detects a wobble signal based on the output signal of the I/V amplifier 28a. The RF-signal detecting circuit 28d as described above detects a RF signal based on the output signal of the I/V amplifier 28a. The decoder 28e as described above extracts address information and a synchronizing signal, etc., from the wobble signal as described above. Such extracted address information as described above is output to the CPU 40, while the synchronizing signal is output to the encoder 25. Moreover, the decoder 28e performs a decoding process and an error-correcting process on the RF signal as described above so that, when an error is detected, a correcting process is performed after which the processed data are stored as reproducing data via the buffer manager 37 as described above into the buffer RAM 34 as described above.

The servo-control circuit 26 as described above has a PU-control circuit 26a, a seek-motor control circuit 26b, and a SP-motor control circuit 26c. The PU-control circuit 26a as described above generates a drive signal for the focusing actuator based on the focusing-error signal in order to correct for a focus offset of the object lens constituting the optical-pickup apparatus 23 as described above. Moreover, the PU-control circuit 26a generates a drive signal for the tracking actuator based on the tracking-error signal in order to correct for a track offset of the object lens. Each of such drive signals generated is output to the optical-pickup apparatus 23. Hereby, tracking control and focusing control are performed. The seek-motor control circuit 26b as described above generates a drive signal for driving the seek motor 21 based on an instruction of the CPU 40. Such drive signal generated is output to the seek motor 21. The SP-motor control circuit 26c as described above generates a drive signal for driving a spindle motor 22 based on an instruction of the CPU 40. Such drive signal generated is output to the spindle motor 22.

To the buffer RAM 34, data for recording in the optical disk 15 (data for recording), and data reproduced from the optical disk 15 (reproducing data), etc., are stored temporarily. Inputting and outputting of data to and/or from this buffer RAM 34 are controlled by the buffer manager 37 as described above.

The encoder 25 as described above, based on an instruction of the CPU 40, takes out the data for recording that is being accumulated in the buffer RAM 34 via the buffer manager 37, modulates the data taken out and adds to the modulated data an error-correcting code, etc., and generates a signal for writing into the optical disk 15. Such write-in signal generated is output to the laser-control circuit 24.

The laser-control circuit 24 as described above controls the power level of a laser light-beam output from the semiconductor laser constituting the optical-pickup apparatus 23 as described above. For example, when recording, a drive signal for the semiconductor laser is generated at the laser-control circuit 24 based on the write-in signal, recording conditions, and light-emitting characteristics of the semiconductor laser.

The interface 38 as described above being a bi-directional communications interface with an upper-level apparatus 90 (a personal computer, for example) is compliant with such standard interfaces as an ATAPI (AT Attachment Packet Interface), a SCSI (Small Computer-System Interface) and a USB (Universal Bus Interface).

The flash memory 39 as described above is configured to include a program area and a data area. In this program area is being stored programs including a program in the present invention that is written in a code decodable at the CPU 40. Moreover, in the data area is stored the recording conditions and the light-emitting characteristics of the semiconductor laser.

The CPU 40 as described above controls operations of each of the portions as described above according to the programs being stored in the program area of the flash memory 39 and also saves data required for control, etc., in the RAM 41 and the buffer RAM 34, etc.

Figure 2:
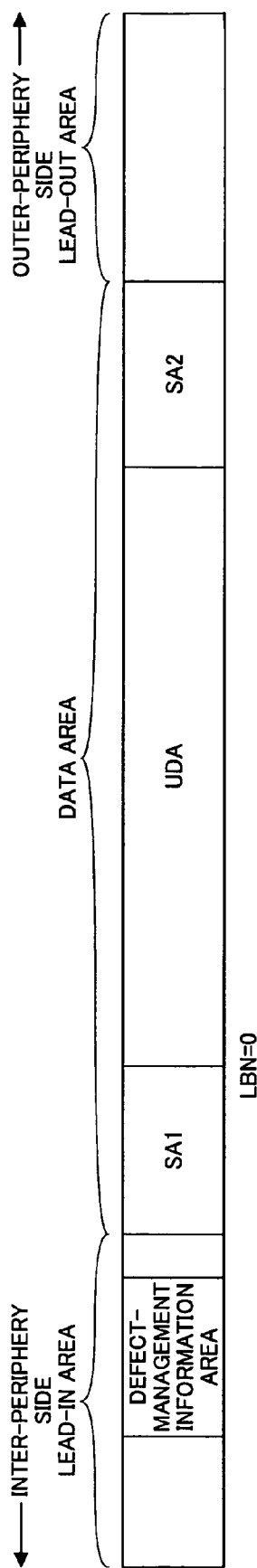
FIG. 2 is a data diagram for describing a layout of recording areas in a conventional defect-management method.

Now, major portions related to defect management are described using FIG. 2 for a layout of recording areas (a disk layout) in a conventional defect-management method.

In this conventional example, as illustrated in FIG. 2, the recording areas are divided into a lead-in area, a data area, and a lead-out area.

In the lead-in area, there is a defect-management information area in which the defect-management information, etc., is recorded.

Recording and reproducing of data are performed on the data area. To every sector of the data region, an absolute address called a physical address is allocated in advance. This data area is divided into a Sparing Area 1 (below called "SA1"), a User-Data Area (below called "UDA"), and Sparing Area 2 (below called "SA2").

The UDA is an area provided for storing user data. Each sector included in this UDA is allocated a logical address so that a user uses the logical address to access the optical disk for performing data recording and reproducing.

The SA1 and SA2 are respectively an area (a sparing area) used, when a defect occurs in an area in the UDA, in lieu of the area of the defect (a defective area). The SA1 is arranged closer to the inner-periphery side than the UDA. Such arrangement is for performing at high speed a process of replacing the defect area, when a defect occurs in an area in which file-management information (including unused-space management information and root-directory file entries) is stored. The file-management information is stored in the vicinity of a sector to which a logical address "0" is assigned. Therefore, arranging the SA1 at the inner-periphery side makes it possible to reduce a seek distance between the defective area and the sparing area. Hereby the speed of the process of replacing the defective area is increased. The SA2 is arranged closer to the outer-periphery side than the UDA.

In the defect-management information area is stored a sparing list associating a defect within the UDA and a sparing area to be used in lieu of this defective portion.

Figure 3:
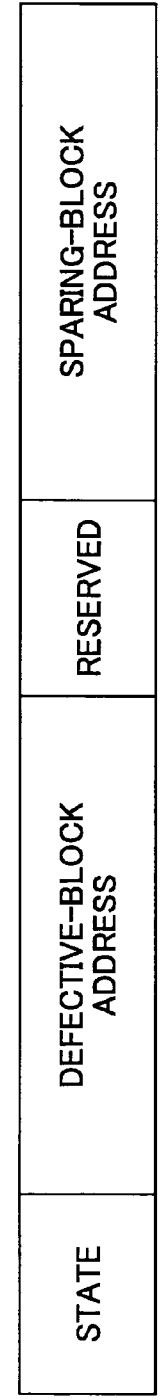
FIG. 3 is a diagram for describing a sparing list in the conventional defect-management method.

In this conventional example, defect management is performed per ECC block. This sparing list, as illustrated in FIG. 3, includes a sparing-block address of a sparing block which the sparing list manages, a defective-block address of a defective block within an UDA that is replaced with the sparing block, and state information describing a state of the sparing list.

The state information as described above includes information indicating whether data of the defective block are replaced with the sparing block.

Next, a sparing list for the first embodiment of the present invention is described using FIGS. 4A and 4B. Hereby, as illustrated in FIG. 4A, to the sparing list in the conventional example as described above is added, a bit-map area for storing bit-map information as identifying information and an area for storing a PBN of previous replacement block, which is information concerning an area in which unreplaced data are stored. It is noted that information including the block-management information for performing defect management per ECC block and the bit-map information is called defect-management information.

As illustrated in FIGS. 5A through 5C, the bit-map information is such that each bit corresponds to a sector (subblock) constituting an ECC block so that it is assumed that, as an example, "0" is set to a bit corresponding to a sector (a sparing subblock) in which data are replaced while "1" is set to a bit corresponding to a sector (a non-sparing subblock) in which data are not replaced. It is noted that, in the present first embodiment, one ECC block consists of 16 sectors so that the size of the bit-map area is 2 bytes (16 bits). In other words, the bit-map information is a two-byte data set.

The PRB as described above is used for storing, when a defect is detected in a UDA (or a sparing region) so that data within the defective block is partially replaced, an address of the defective block in a sparing list corresponding to a sparing block to be replaced.

Moreover, state-information is divided into state 1 and state 2 so as to store the divided state-information. Then, as illustrated in FIG. 4B, with a combination of the state 1 and the state 2, a state of a sparing block is represented. The state 1="0000b" represents that a defective block is assigned to the sparing block and data are replaced. The state 1="0001b" represents that a defective block is assigned to the sparing block and data are not replaced. The state 1="0010b" represents an unused sparing-list with no defective block assigned. The state 1="0011b" represents that the sparing block is defective. When the state 1="0000b", further detailed state-information is defined with the state 2. It is noted that, for convenience, the most-significant bit through the least-significant bit in the state information are to be called respectively the first through the fourth bits.

The fourth bit of the state 2 represents whether the same data are recorded in the defective block and the sparing block. In other words, when the fourth bit is "0" (the state 2="00x0b"), the same data are recorded in the defective block and the sparing block, while when the fourth bit is "1" (the state 2="00x1b"), different data are recorded in the defective block and the sparing block. It is noted "x" represents that the value may be one of "0" and "1".

Moreover, the third bit of the state 2 represents whether the data of the defective block are partially replaced with those of the sparing block. In other words, when the third bit is "0" (the state 2="00x0b"), the data of all sectors in the defective block are replaced, while when the third bit is "1" (the state 2="00x1b"), the data of the defective block are partially replaced.

Therefore, it suffices to refer to the bit-map area only when the state 2="00x1b" so that, when the state 2="00x0b", the fact that data of all sectors within the sparing block are replaced may be determined without referring to the bit-map area. Moreover, when replacing a defective block, when all the data within the defective block are replaced, setting the state 2 "00x0b" makes it unnecessary to set the bit-map information. Thus, setting the state information with information as to whether data of the sparing block are partially replaced facilitates defect management.

(Recording Process)

Figure 6:
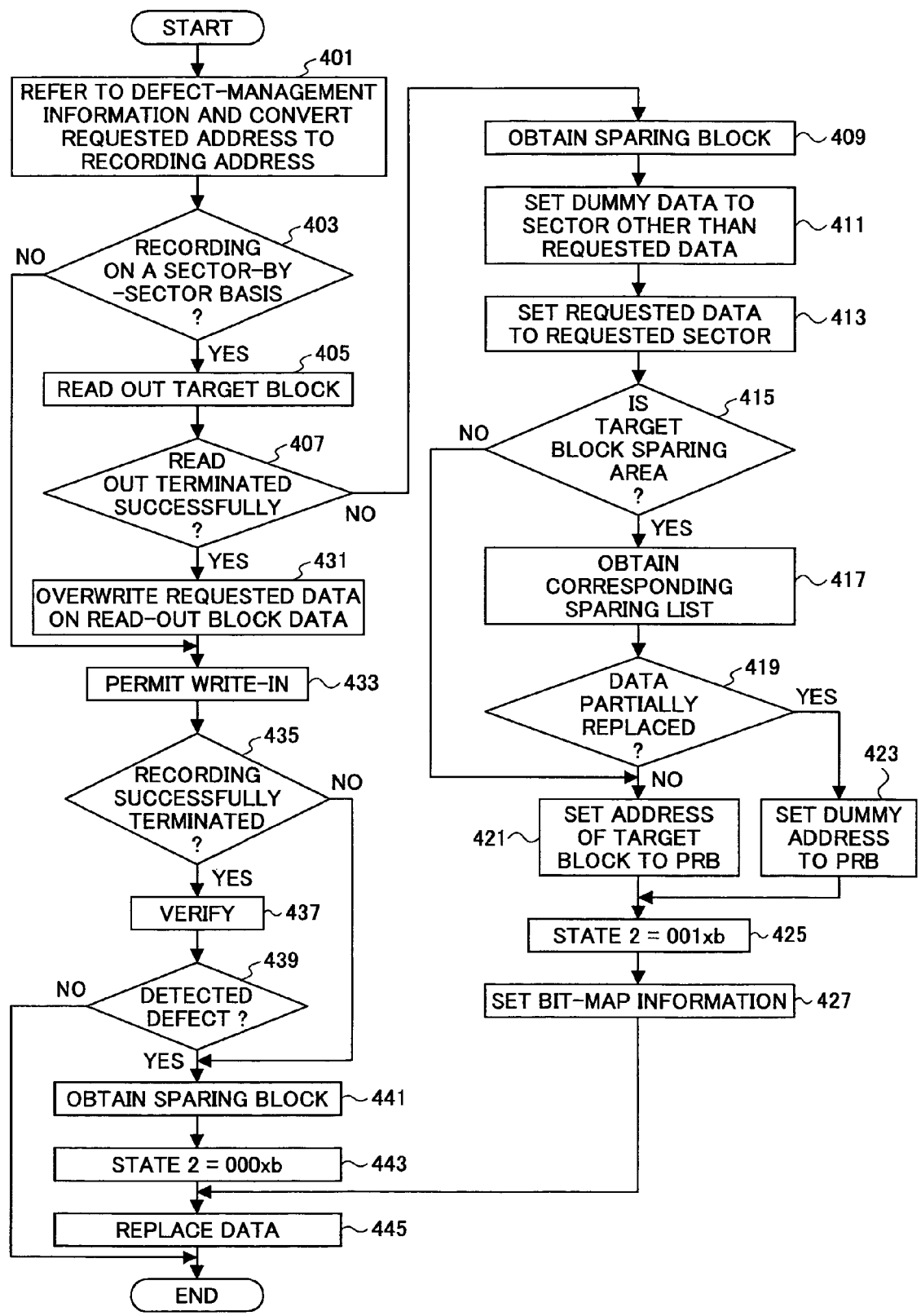
FIG. 6 is a flowchart for describing a recording process in the first embodiment.

Next, a process when the optical-disk apparatus 20 configured as described above receives from the upper-level apparatus 90 a command for recording is described using FIG. 6. The flowchart in FIG. 6 corresponds to a series of process algorithms executed by the CPU 40. It is assumed that recording is requested for sectors within an ECC block N from a sector 8 (to be represented as S8) to a sector 11 (to be represented as S11) (refer to FIG. 5A).

The optical-disk apparatus receives from the upper-level apparatus 90 a command for recording, which causes a starting address of a program (below called "a first recording-process program") corresponding to the flowchart in FIG. 6 to be set to a program counter of the CPU 40 so that the recording process is started.

In step 401, defect-management information is referred to so that a requested address (a logical address) designated from a user is converted to a recording address. Herein, the requested address is converted to a physical address so that, when this physical address is not registered in a sparing list, the physical address as it is becomes the recording address, while when the physical address is registered in the sparing list, the address to be replaced becomes the recording address.

In step 403, whether the recording the user has requested is on a sector-by-sector basis is determined based on the command for recording. If the user request is a recording on a sector-by-sector basis, the decision herein is set affirmative so that the process shifts to step 405.

In step 405, an ECC block N (below "target block N") is read out.

In step 407, whether the reading-out of the target block N is successfully terminated is determined. When the reading-out is not successfully terminated, the decision herein is set negative so that the process shifts to step 409. In other words, the target block N is a defective block.

In step 409, the defect-management information is referred to so that a sparing block to be used for replacing is obtained from an unused sparing list (a sparing list such that the state 1 is "0010b"). Herein it is assumed that an ECC block M (below called "a sparing block M") is obtained as a sparing block. Then, for convenience, a sparing list corresponding to the sparing block M is called the sparing list M.

In step 411, dummy data are set to portions corresponding to a sector other than the requested sector that is in the data for writing in. Herein, as illustrated in FIG. 5B, dummy data are set to portions corresponding to S0 through S7, and S12 through S15.

In step 413, data which the user has requested (below also called "requested data") are set to a portion corresponding to requested sectors in the data for writing in. As illustrated in FIG. 5B, the requested data are set to S8 through S11. Hereby, data for writing in are generated.

In step 415, whether the target block N belongs to the sparing area is determined. When the target block N belongs to the sparing area, the decision herein is set positive so that the process shifts to step 417. In other words, the target block is a defective sparing block.

In step 417, a sparing list (to be called a sparing list N) corresponding to the target block N is obtained.

In step 419, state information of the sparing list N is referred to so that whether the target block N is a sparing block such that the data are partially replaced is determined. When the target block N is not a sparing block such that the data are partially replaced, the decision herein is set negative so that the process shifts to step 421.

In step 421, an address of the target block N is set to a PRB of a sparing list M. This address is an information set regarding an area in which data of an unreplaced portion are stored.

In step 425, information is set to state information of the sparing list M indicating that the data are partially replaced. Herein "0001xb" is set to the state 2.

In step 427, information identifying in the sparing block M a sector in which the data are replaced and a sector in which the data are not replaced is set to bit-map information of the sparing list M. As illustrated in FIG. 5C, "1" is set to a bit corresponding to S0 through S7 and S12 through S15, while "0" is set to a bit corresponding to S8 through S11. Then, the process shifts to step 445.

In step 445, data for writing in the sparing block M are replaced. Hereby, the data for writing in are recorded in the sparing block M via the encoder 25, the laser-control circuit 24, and the optical-pickup apparatus 23. It is noted that, at this time, updated defect-management information and bit-map information are also recorded in the optical disk 15. Then, the recording process is terminated.

It is noted that, in step 419 as described above, when the target block N is a sparing area such that the data are partially replaced, the decision herein is set affirmative so that the process shifts to step 423. In step 423, dummy address-information (for example, "FFFFFFh") is set to the PRB of the sparing list M. This dummy address-information is information representing that an area in which data of the unreplaced portion are stored cannot be specified. Then, the process shifts to step 425 as described above.

Then, in step 415 as described above, when the target block N does not belong to the sparing area, the decision herein is set negative so that the process shifts to step 421 as described above.

On the other hand, in step 407 as described above, when the reading out is successfully terminated, the decision in step 407 is set positive so that the process shifts to step 431.

In step 431, requested data are overwritten on data of the target block N that are read out so that the overwritten data are set as data for writing in. The requested data are set to a portion corresponding to S8 through S11.

In step 433, data for writing in are written. Hereby, the data for writing in are recorded in the target block N via the encoder 25, the laser-control circuit 24, and the optical-pickup apparatus 23.

In step 435, whether recording the data for writing in is successfully terminated is determined. When the recording of the data for writing in is successfully terminated, the decision herein is set affirmative so that the process shifts to step 437.

In step 437, a verifying process is performed on the target block N in which the data for writing in are recorded.

In step 439, whether there is a defect in the target block N in which the data for writing in are recorded is determined based on the outcome of the verifying process. For example, when an error rate is at or above a predetermined value, the decision herein is set affirmative so that the process shifts to step 441.

In step 441, a sparing block to be used in replacing in the same manner as in the step 409 as described above is obtained. For convenience, as in the same manner as the step 409 as described above, it is assumed that as the sparing block an ECC block M (a sparing block M) is obtained.

In a next step 443, as data of all sectors within the target block N are maintained, information indicating that the data of all the sectors are replaced is set to state information of the sparing list M. Herein, "000xb" is set to the state 2. Then, the process shifts to step 445. It is noted that, in this case, as it is known from the state 2 that the sparing block M is not a sparing block such that the data are partially replaced, setting of the bit-map information and the PRB of the sparing list M is not performed.

It is noted that, in step 439 as described above, when a defect is not detected, the decision in step 439 is set negative so that the recording process is terminated.

Moreover, in step 435 as described above, when the data recording is not terminated successfully, the decision in step 435 is set negative so that the process shifts to step 441. In other words, the verifying process is skipped so as to shift to the sparing process.

Furthermore, in step 403 as described above, when the recording for which the user requests is per ECC block, the decision in step 403 is set negative so that the process shifts to step 433. In other words, the Read-Modify-Write process is skipped.

(Reproducing Process)

Figure 7:
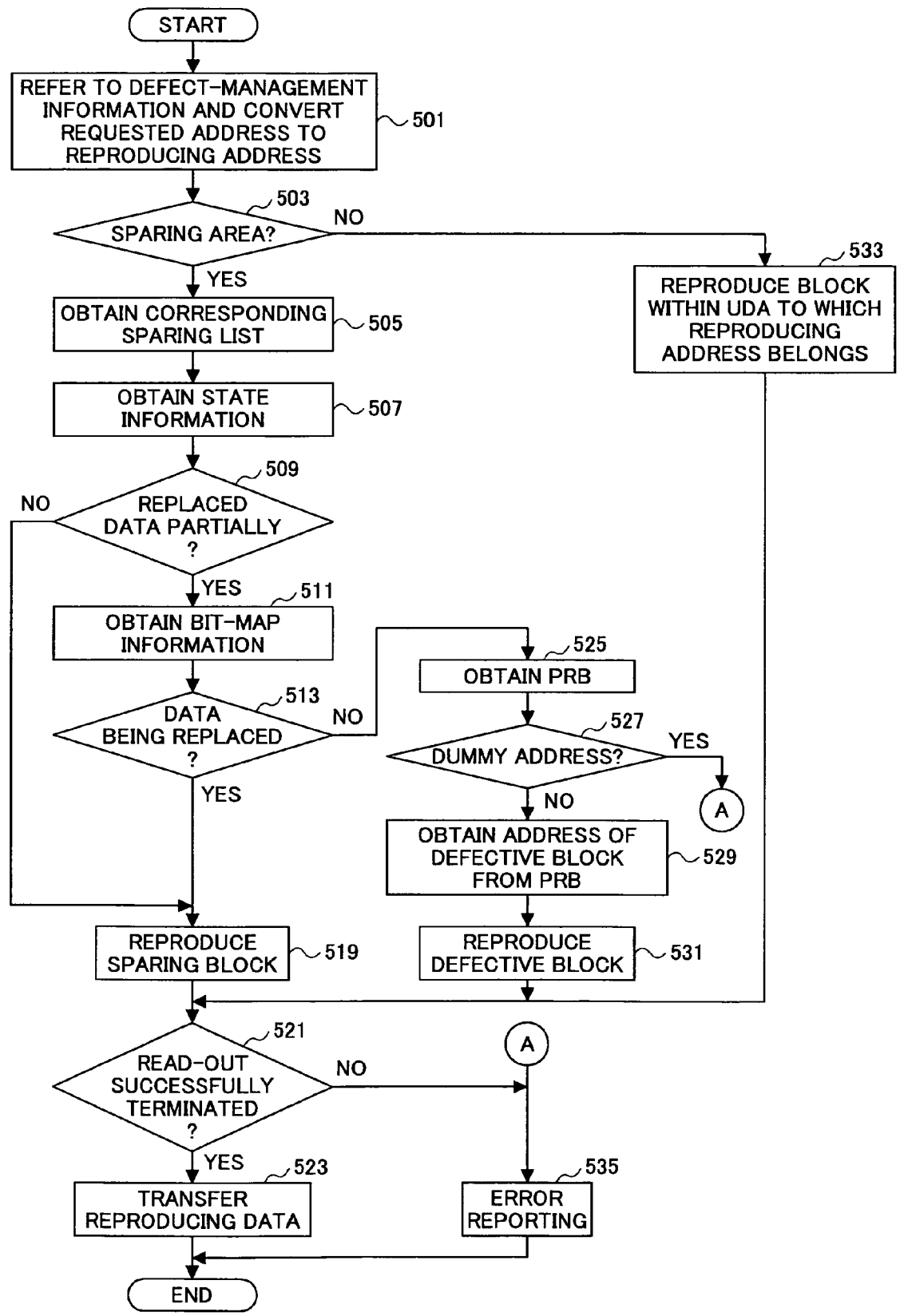
FIG. 7 is a flowchart for describing a reproducing process in the first embodiment.

Next, a process when the optical-disk apparatus 20 receives from the upper-level apparatus 90 a command for reproducing is described using FIG. 7. The flowchart in FIG. 7 corresponds to a series of process algorithms executed by the CPU 40. It is assumed that, as an example, a request for reproducing from a user is made on a sector by sector basis.

The optical-disk apparatus receiving from the upper-level apparatus 90 a command for reproducing causes a starting address of a program (below called "a first reproducing-process program") corresponding to the flowchart in FIG. 7 to be set to the program counter of the CPU 40 so that the reproducing process is started.

In a step 501, defect-management information is referred to so that a requested address is converted to a reproducing address. The requested address designated from a user as a logical address is converted to a physical address so that, when this physical address is not registered in a sparing list, or is of an area (the state 1="0001b") such that the data are not replaced even though the address is registered, the physical address as it is becomes the reproducing address, while when the physical address is registered in the sparing list so that the address is of an area (the state 1="0000b") such that the data are replaced, the address to be replaced becomes the reproducing address.

In step 503, whether the reproducing address is included in the sparing area is determined. When the reproducing address is included in the sparing area, the decision herein is set affirmative so that the process shifts to step 505.

In step 505, a sparing list (below also called "a corresponding sparing list") corresponding to a sparing block to which the reproducing address belongs is obtained.

In step 507, state information is obtained from the corresponding sparing list.

In step 509, whether the sparing block is such that the data are partially replaced is determined. When the state 2 is "001xb", as the sparing block is such that the data are partially replaced, the decision herein is set affirmative so that the process shifts to step 511.

In step 511, bit-map information is obtained from the corresponding sparing list.

In step 513, the bit-map information is referred to so that whether data are replaced in a sector indicated by the reproducing address is determined. When a flag corresponding to the sector indicated by the reproducing address is "0", the decision herein is set affirmative so that the process shifts to step 519.

In step 519, a block (herein a sparing block) to which the reproducing address belongs is reproduced.

In step 521, whether reading out is successfully terminated is determined. When the reading out is terminated successfully, the decision herein is set affirmative so that the process shifts to step 523.

In step 523, the reproducing data are transferred. The reproducing data stored via the reproducing-signal processing circuit 28 into the buffer RAM 34 as described above are transferred to the upper-level apparatus 90 on a sector-by-sector basis. Then, the reproducing process is terminated.

It is noted that, in step 521 as described above, when the reading out is not terminated successfully, the decision in step 521 is set negative so that the process shifts to step 535. In step 535, an error is reported to the user. Then, the reproducing process is terminated.

It is noted that, in step 513 as described above, when a flag corresponding to a sector indicated by the reproducing address is "1", the decision in step 513 is set negative so that the process shifts to step 525. In step 525, a PRB is obtained from the corresponding sparing list. Then, in step 527, whether the obtained PRB is dummy address-information (for example, "FFFFFFh") is determined. When the PRB is dummy address-information, the decision herein is set negative so that the process shifts to step 535. In other words, as an area in which data of an unreplaced portion are stored cannot be specified, an error is reported to the user. On the other hand, when the PRB is not dummy address-information, the decision herein is set negative so that the process shifts to step 529. In step 529, as dummy data are recorded in a sector indicated by the reproducing address, an address of a block in which data of an unreplaced portion are stored (in other words, a defective block) is obtained from a PRB of a corresponding sparing list. Then in step 531 the defective block is reproduced. Then the process shifts to step 521.

Moreover, in step 509 as described above, when the state 2 is "000xb", as the sparing block is such that all of the data are replaced, the decision in step 509 is set negative so that the process shifts to step 519.

Furthermore, in step 503 as described above, when the reproducing address is not included in the sparing area, the decision in step 503 is set negative so that the process shifts to step 533. In step 533, a block to which the reproducing address belongs (a block within an UDA herein) is reproduced. Then, the process shifts to step 521.

Second Embodiment

Below a second embodiment of the present invention is described using FIGS. 8A through 11. As illustrated in FIGS. 8A and 8B, this second embodiment differs from the first embodiment as described above in the configuration of the sparing list, position of storing the bit-map information, and the contents of the state 2. Therefore, while some of the programs stored in a flash memory 39 differ from the first embodiment, the configuration of the optical-disk apparatus, etc., is the same as the first embodiment as described above. Then, in the following, primarily the differences with the first embodiment are described and also the same letters are used for the elements which are the same as or equivalent to the first embodiment as described above so that the explanation is simplified or omitted.

As illustrated in FIG. 8A, in the present second embodiment, the configuration of the sparing list is such that the bit map and the RPB are excluded from the sparing list in the first embodiment.

Moreover, while the bit-map information is set in the same manner as in the first embodiment, as an example, as illustrated in FIG. 8B, a dedicated area for storing the bit-map information is provided at an area for storing defect-management information within the lead-in area. The defect-management information area in the present second embodiment includes "an area for storing basic defect-management information", multiple "sparing-table groups", and "a bit-map area". In the "area for storing basic defect-management information", basic defect-management information is stored. The data structure of this basic defect-management information is described below. The "sparing-table groups" are areas in which multiple sparing lists are stored. The sparing table groups consist of predetermined blocks and the number of the sparing table groups also becomes variable depending on the number of the sparing lists. In the present example, it is assumed that two sparing-table groups, a sparing-table group 0 and a sparing-table group 1, exist. In the "bit-map area", bit-map information corresponding to all sectors included in the sparing area is stored.

The sparing-table groups and the bit-map area sequentially take up the space preceding the area for storing basic defect-management information toward the inner-periphery side. When one of the sparing-table groups and the bit-map area becomes defective (for example, the sparing-table group 1 becoming defective in FIG. 8B), the sparing-table group 1 is to be replaced in an area at the inner-periphery side of the bit-map area.

FIG. 8C represents major portions of the basic defect-management information. This basic defect-management information includes "an identifying ID", "a version number", "update count", "a SA1 size", "a SA2 size", "the number of sparing-table groups", "position information on sparing-table group 0", "position information on sparing-table group 1", as well as "position information on bit-map area", "SA2 byte-offset information", and "a bit-map size", etc. In the "identifying ID", ID information indicating that the information is basic defect-management information is stored. In the "version number", a version number of the basic defect-management information is stored. In "the update count", the number of times the defect-management information is updated (recorded) is stored. Moreover, in "the SA 1 size", the size of the SA1 is stored. In "the SA 2 size", the size of the SA2 is stored. Furthermore, in "the number of sparing-table groups", the number of sparing-table groups existing on the disk is stored. In the "position information on the sparing-table group 0", information regarding an area in which the sparing-table group 0 is recorded is stored. In the "position information on the sparing-table group 1", information regarding an area in which the sparing-table group 1 is recorded is stored. In the "bit-map area position information", address information of the bit-map area is stored. In the "SA2 byte-offset information", information on an offset (the offset represented in the number of bytes from the start of the bit-map area) within the bit-map area in which a bit corresponding to a first sector of the SA2 is stored. In "the bit-map size", the size (the number of bytes) of a valid bit-map within the bit-map area is stored.

Moreover, as illustrated in FIG. 9, in a state 2 when the state 1="0000b", the contents of the state 2 in the first embodiment as described above is partially modified. Therefore, some of the programs stored in the flash memory 39 differ from those in the first embodiment.

As for the fourth bit of the state 2, it is the same as in the first embodiment. In other words, when the fourth bit is "0" (the state 2="0xx0b"), the same data are recorded in the defective block and the sparing block, while when the fourth bit is "1" (the state 2="0xx1b"), different data are recorded in the defective block and the sparing block.

In the present second embodiment, new meanings are added to the second and third bits of the state 2. The second and third bits being "0" (the state 2="000xb") represents that the data of all sectors in the defective block are being replaced.

The second bit being "0" and the third bit being "1" (the state 2="001xb") represent that the data of the defective block are partially replaced and that an area including data of an unreplaced portion is in the UDA.

The second bit being "1" and the third bit being "0" (the state 2="010xb") represent that the data of the defective block are partially replaced and that the area including the data of the unreplaced portion is in the SA (Sparing Area).

The second bit being "1" and the third bit being "1" (the state 2="011xb") represent that the data of the defective block are partially replaced and that the region including the data of the unreplaced portion cannot be specified.

(Recording Process)

Figure 10:
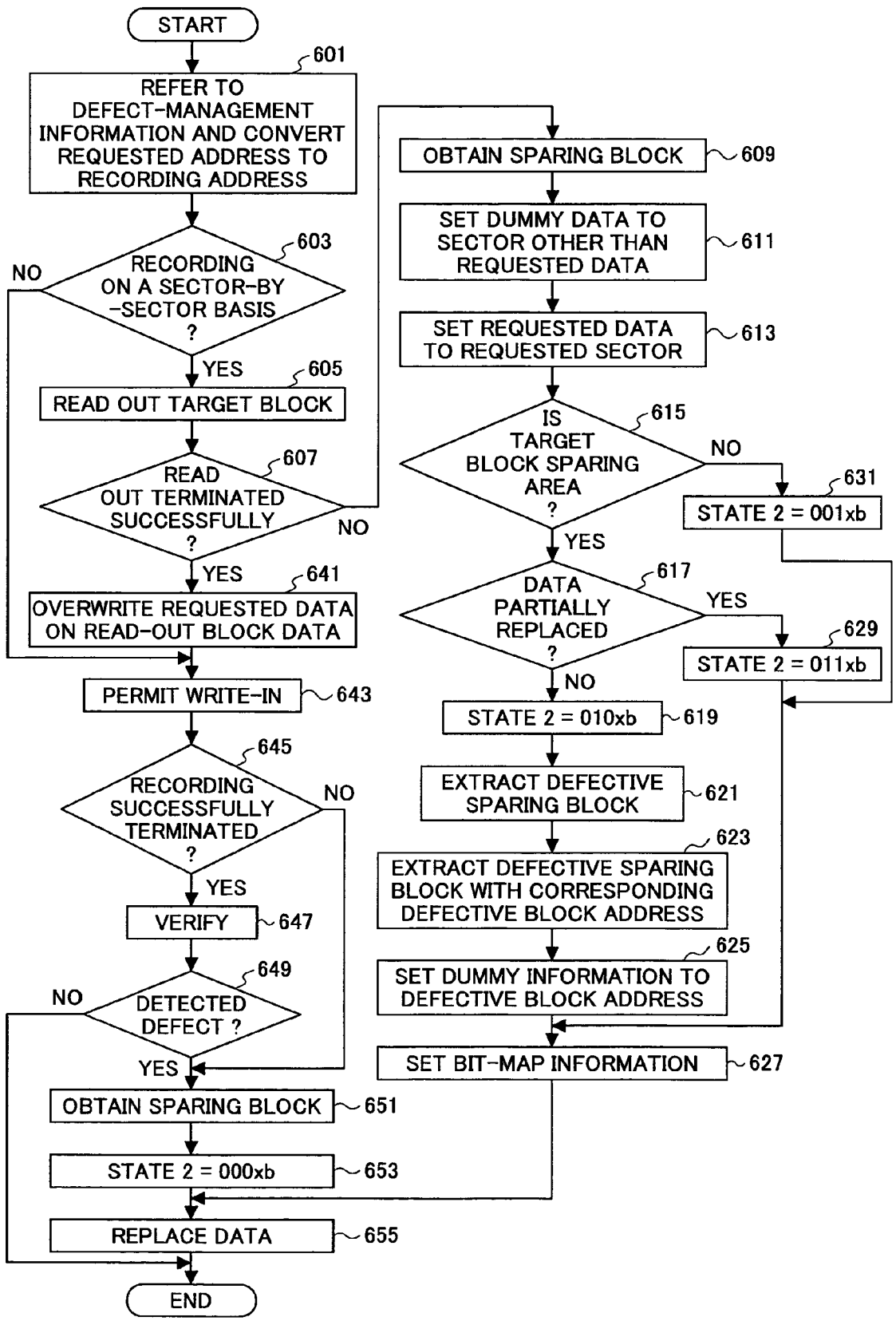
FIG. 10 is a flowchart for describing a recording process in the second embodiment.

Next, a process when the optical-disk apparatus 20 receives from the upper-level apparatus 90 a command for recording is described using FIG. 10. The flowchart in FIG. 10 corresponds to a series of process algorithms executed by the CPU 40. It is assumed that recording is requested for sectors within the ECC block N from a sector 8 (to be represented as S8) to a sector 11 (to be represented as S11).

The optical-disk apparatus receiving from the upper-level apparatus 90 a command for recording causes a starting address of a program (below called "a second recording-process program") corresponding to the flowchart in FIG. 10 to be set to a program counter of the CPU 40 so that the recording process is started.

In step 601, similar to step 401, the requested address is converted to a recording address.

In step 603, whether the recording the user has requested for is recorded on a sector-by-sector basis is determined based on the command for recording. As the user request is recorded on a sector-by-sector basis, the decision is set affirmative so that the process shifts to step 605.

In step 605, an ECC block N (target block N) including the requested sector is read out.

In step 607, whether the reading-out of the target block N is successfully terminated is determined. When the reading-out is not successfully terminated, the decision herein is set negative so that the process shifts to step 609.

In steps 609 through 613, the same process as in the steps 409 through 413 is performed. It is assumed that, as in the first embodiment, an ECC block M (a sparing block M) is obtained as a sparing block.

In step 615, whether the target block N belongs to the sparing area is determined. When the target block N belongs to the sparing area, the decision herein is set positive so that the process shifts to step 617. Thus, a sparing list N exists.

In step 617, a sparing list N is referred to so that whether the target block N is a sparing block for which the data are partially replaced is determined. When the state 2 of the sparing list N is "000xb", as all of the data in the target block N are replaced, the decision herein is set negative so that the process shifts to step 619.

In step 619, information representing that an area including data of an unreplaced portion belongs to the sparing area (the state 2="010xb") is set to state information of a sparing list M.

In step 621, other sparing lists stored in the area for storing sparing table are searched so that sparing lists such that the sparing block is defective (the state 1="0011b") are extracted.

In step 623, out of the extracted sparing lists, a sparing list such that its defective block address corresponds to a defective block address within the UDA stored in the sparing list N is extracted.

In step 625, dummy information (for example, "000000h") is set to a defective block address of the extracted sparing list.

In step 627, the same process as in step 425 is performed. Then, the process shifts to step 655.

In step 655, data for writing into the sparing block M is replaced. Then, the recording process is terminated.

It is noted that, in step 617 as described above, when the state 2 of the sparing list N is not "000xb", as the target block N is a sparing block for which the data are partially replaced, the decision in step 617 is set affirmative so that the process shifts to step 629. In step 629, information (state 2="011xb") representing that an area including data of an unreplaced portion cannot be specified is set to the state information of the sparing list M. Then, the process shifts to step 627.

Moreover, in step 615 as described above, when the target block N belongs to the UDA, the decision herein is set negative so that the process shifts to step 631. In step 631, information (the state 2="001xb") representing that an area including data of an unreplaced portion belongs to the data area is set to the state information of the sparing list M. Then, the process shifts to step 627.

On the other hand, in step 607 as described above, when the reading out is successfully terminated, the decision in step 607 is set positive so that the process shifts to step 641.

In steps 641 and 643, the same process as in the steps 431 and 433 are performed.

In step 645, whether recording the data for writing in is successfully terminated is determined. When the recording of the data for writing in is successfully terminated, the decision herein is set affirmative so that the process shifts to step 647.

In step 647, a verifying process is performed on the target block N in which the data for writing in are recorded.

In step 649, whether there is a defect in the target block N in which the data for writing in are recorded is determined based on the outcome of the verifying process. For example, when an error rate is at or above a predetermined value, the decision herein is set affirmative so that the process shifts to step 651.

In steps 651 and 653, the same process as in the steps 441 and 443 are performed. Then, the process shifts to step 655.

It is noted that, in step 649 as described above, when a defect is not detected, the decision in step 649 is set negative so that the recording process is terminated.

Moreover, in step 645 as described above, when the recording of the data for writing in is not terminated successfully, the decision in step 645 is set negative so that the process shifts to step 651.

Furthermore, in step 603 as described above, when the user request is for recording per ECC block, the decision in step 603 is set negative so that the process shifts to step 643.

(Reproducing Process)

Figure 11:
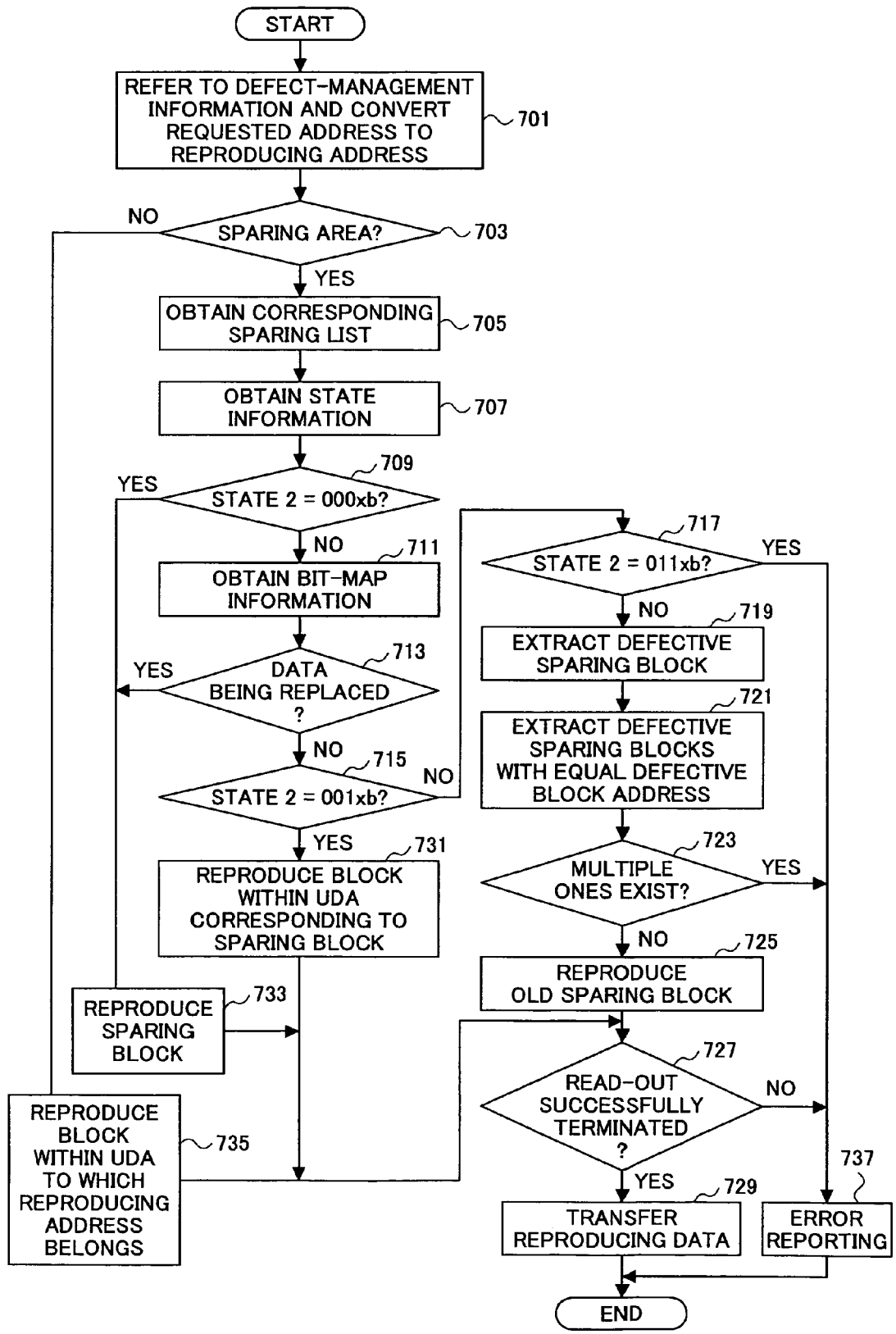
FIG. 11 is a flowchart for describing a reproducing process in the second embodiment.

Next, a process when the optical-disk apparatus 20 receives from the upper-level apparatus 90 a command for reproducing is described using FIG. 11. The flowchart in FIG. 11 corresponds to a series of process algorithms executed by the CPU 40. It is assumed that, as an example, a request for reproducing from a user is made on a sector-by-sector basis.

The optical-disk apparatus receiving from the upper-level apparatus 90 a command for reproducing causes a starting address of a program (below called "a second reproducing-process program") corresponding to the flowchart in FIG. 11 to be set to the program counter of the CPU 40 so that the reproducing process is started.

In step 701, similar to step 501, the requested address is converted to the reproducing address.

In step 703, whether the reproducing address is included in the sparing area is determined. When the reproducing address is included in the sparing area, the decision is set affirmative so that the process shifts to step 705.

In steps 705 and 707, the same process as in the steps 505 and 507 are performed.

In step 709, whether the state 2 is "000xb" is determined. When the state 2 is not "000xb", the decision herein is set negative so that the process shifts to step 711.

In step 711, bit-map information is obtained from the corresponding sparing list.

In step 713, the bit-map information is referred to so that whether data are replaced in a sector indicated by the reproducing address is determined. When a flag corresponding to the sector indicated by the reproducing address is "1", the decision herein is set negative so that the process shifts to step 715.

In step 715, whether the state 2 is "001xb" is determined. When the state 2 is not "001xb", the decision herein is set negative so that the process shifts to step 717.

In step 717, whether the state 2 is "011xb" is determined. When the state 2 is not "011xb", the decision herein is set negative so that the process shifts to step 719.

In step 719, sparing lists stored in an area for storing sparing tables is searched so that sparing lists such that the state 1="0011b", or that the sparing block is defective is extracted. In other words, sparing lists associated with the defective sparing block are extracted.

In a step 721, out of the extracted sparing lists as described above, a sparing list having a sparing block address which is the same as an address of the defective block corresponding to a sparing block to which the reproducing address belongs is further extracted. It is noted that the sparing block in the sparing list extracted is to be called "an old sparing block" for convenience.

In a step 723, whether multiple old sparing blocks exist is determined. If the number of old sparing blocks is 1 (one), the decision herein is set negative so that the process shifts to step 725.

In step 725, the old sparing block is reproduced.

In step 727, whether reading out is successfully terminated is determined. When the reading out is terminated successfully, the decision herein is set affirmative so that the process shifts to step 729.

In step 729, the reproducing data are transferred to the upper-level apparatus 90 on a sector-by-sector basis. Then, the reproducing process is terminated.

It is noted that, in step 727 as described above, when the reading out is not terminated successfully, the decision in step 727 is set negative so that the process shifts to step 737. In step 737, error reporting to the user is performed. Then, the reproducing process is terminated.

In step 723 as described above, when multiple old sparing blocks exist, the decision in step 723 is set affirmative so that the process shifts to step 737. In other words, as it is not possible to specify in which of the multiple old sparing blocks data of an unreplaced portion is stored, an error is reported to the user.

In step 717 as described above, when the state 2 is "011xb", the decision in step 717 is set affirmative so that the process shifts to step 737. In other words, as the block in which data of an unreplaced portion are stored cannot be specified, an error is reported to the user.

In step 715 as described above, when the state 2 is "001xb", the decision in step 715 is set affirmative so that the process shifts to step 731. In other words, it is understood that the block in which the data of the unreplaced portion are stored belongs to the UDA. In step 731, data are reproduced to a block (a defective block within the UDA) corresponding to a block to which the reproducing block belongs (a sparing block). Then, the process shifts to step 727.

In step 713 as described above, when a flag corresponding to the sector indicated by the reproducing address is "0", the decision herein is set affirmative so that the process shifts to step 733. In step 733, the block to which the reproducing address belong (the sparing block) is reproduced. Then, the process shifts to step 727.

Moreover, in step 709 as described above, when the state 2 is "000xb", the decision in step 709 is set affirmative so that the process shifts to step 733. In other words, a block to which the reproducing address belongs (a sparing block) is set as a block to be reproduced as all the data are replaced with the sparing block.

Furthermore, in step 703 as described above, when the reproducing address is not included in the sparing area, the decision in step 703 is set negative so that the process shifts to step 735. In step 735, a block to which the reproducing address belongs (a block within the UDA) is set as a block to be reproduced.

Then, the reproducing as described above may be summarized in accordance with the contents of the state 2 as follows:

1. The State 2="000xb":
   As all of the data are replaced with a sparing block, this sparing block is set as a block to be reproduced;
2. The State 2="001xb":
   As some of the data are replaced with the sparing block and an area in which data of an unreplaced portion are being stored belongs to the UDA, bit-map information is referred to so that when the reproducing address is of a portion in which data are replaced, this sparing block is set as a block to be reproduced. On the other hand, when the reproducing address is of a portion in which data are not replaced, a defective block corresponding to this sparing block is set as a block to be reproduced;
3. The State 2="010xb":
   As some of the data are replaced with the sparing block and an area in which data of an unreplaced portion are stored belongs to the SA, bit-map information is referred to so that when the reproducing address is of a portion in which data are replaced, this sparing block is set as a block to be reproduced. On the other hand, when the reproducing address is of a portion in which data are not replaced, old sparing blocks extracted from multiple sparing lists stored in an area for storing sparing tables are set as a block to be reproduced. It is noted that, when multiple old sparing blocks are extracted, a block to be reproduced cannot be specified;
4. The State 2="011xb":
   As some of the data are replaced with the sparing block and an area in which data of an unreplaced portion are stored cannot be specified, bit-map information is referred to so that when the reproducing address is of a portion in which data are replaced, this sparing block is reproduced. On the other hand, when the reproducing address is not of a portion in which data are replaced, a block to be reproduced cannot be specified;

(Variation 1)

Below a variation 1 of the second embodiment as described above is described using FIGS. 12 through 14. As illustrated in FIG. 12, in this variation 1, the contents of the state 2 of the second embodiment as described above are partially modified to the state 2 when the state 1="0000b". Therefore, some of the programs stored in the flash memory 39 differ from those in the second embodiment.

The fourth bit of the state 2 is the same as in the second embodiment.

The third bit of the state 2 is the same as in the first embodiment. In other words, when the third bit is "0" (the state 2="0x0xb"), data of all sectors of a defective block are replaced, while when the third bit is "1" (the state 2="0x1xb"), the data of the defective block are replaced partially.

In the present variation 1, a new meaning is added to the second bit of the state 2. Herein, the second bit is valid when the third bit is "1". When the second bit is "0" (the state 2="00xxb"), an area including data of an unreplaced portion matches a defective block corresponding to a sparing block; when the second bit is "1" (the state 2="01xxb"), the area including the data of the unreplaced portion does not match the defective block corresponding to the sparing block.

(Recording Process)

Figure 13:
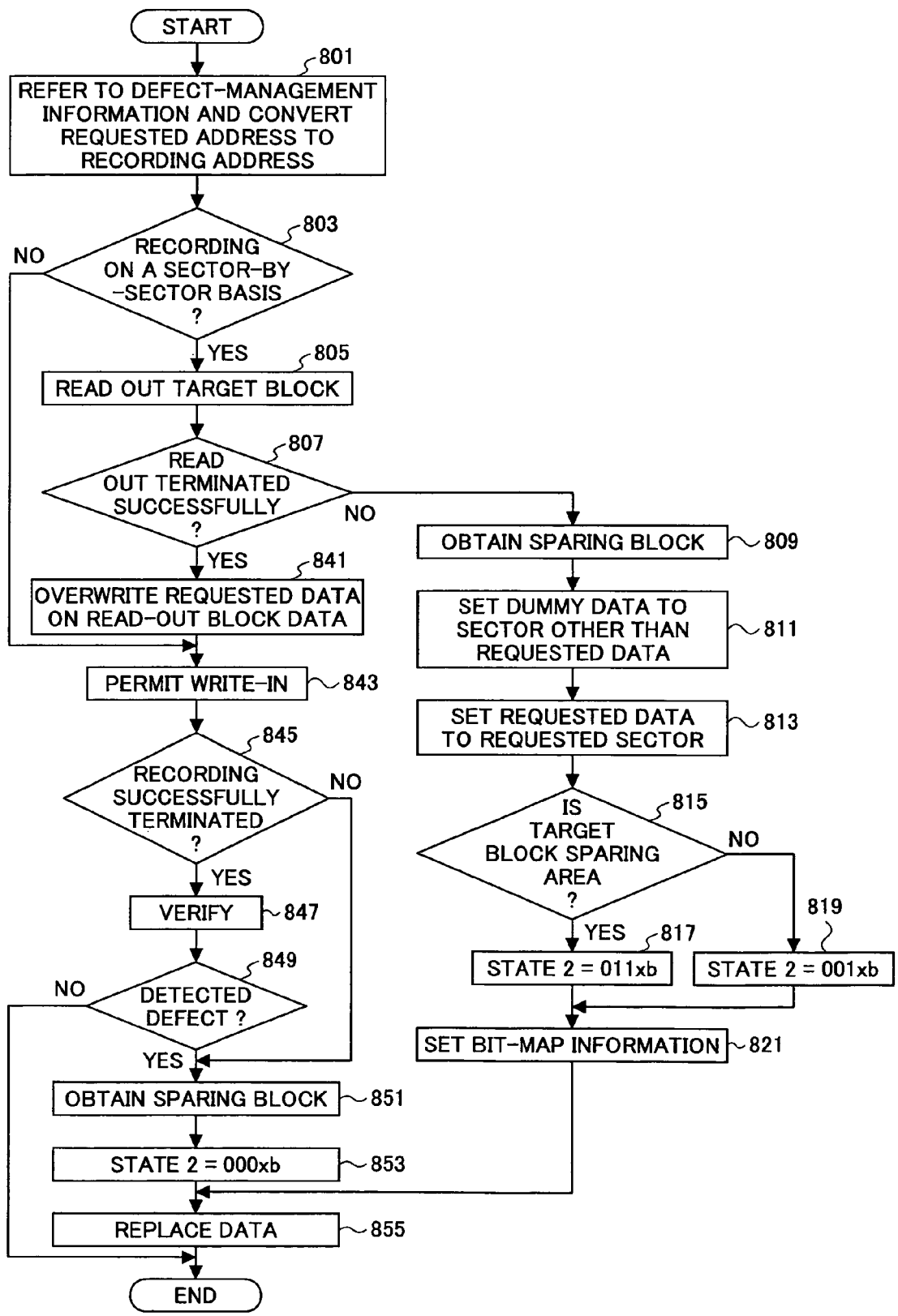
FIG. 13 is a flowchart for describing a recording process in the variation 1 of the second embodiment.

Next, a process when the optical-disk apparatus 20 receives from the upper-level apparatus 90 a command for recording is described using FIG. 13. The flowchart in FIG. 13 corresponds to a series of process algorithms executed by the CPU 40. It is assumed that, as in the second embodiment, recording is requested for sectors from a sector 8 (to be represented as S8) to a sector 11 (to be represented as S11) within the ECC block N.

The optical-disk apparatus receives from the upper-level apparatus 90 a command for recording, which causes a starting address of a program (below called "a third recording-process program") corresponding to the flowchart in FIG. 13 to be set to a program counter of the CPU 40 so that the recording process is started.

In step 801, similar to step 701, the requested address is converted to a recording address.

In step 803, whether the recording the user has requested for is recording on a sector-by-sector basis is determined based on the command requesting for recording. As the user request is a recording on a sector-by-sector basis, the decision herein is set affirmative so that the process shifts to step 805.

In step 805, a target block N is read out.

In step 807, whether the reading-out of the target block N is successfully terminated is determined. When the reading-out is not successfully terminated, the decision herein is set negative so that the process shifts to step 809. In other words, the target block N is a defective block.

In steps 809 through 813, the same process as in steps 609 through 613 is performed. It is assumed that, as in the second embodiment, the ECC block M (the sparing block M) is obtained as a sparing block.

In step 815, whether the target block N belongs to a sparing area is determined. When the target block N belongs to a sparing area, the decision herein is set positive so that the process shifts to step 817.

In step 817, information representing that an area including data of an unreplaced portion does not match a defective block corresponding to a sparing block (the state 2="011xb") is set to state information of a sparing list (sparing list M) corresponding to a sparing block M.

In step 821, the same process as in step 627 is performed. Then the process shifts to step 855.

In step 855, data for writing into the sparing block M is replaced. Then, the recording process is terminated.

Moreover, in step 815 as described above, when the target block N belongs to the UDA, the decision herein is set negative so that the process shifts to step 819. In step 819, information (the state 2="001xb") representing that an area including data of an unreplaced portion matches a defective block is set to the state information of the sparing list M. Then, the process shifts to step 821.

On the other hand, in step 807 as described above, when the reading out is successfully terminated, the decision in step 807 is set positive so that the process shifts to step 841. In steps 841 and 843, the same process as in the steps 641 and 643 is performed.

In step 845, whether recording the data for writing in is successfully terminated is determined. When the recording of the data for writing in is successfully terminated, the decision herein is set affirmative so that the process shifts to step 847.

In step 847, a verifying process is performed on the target block N in which the data for writing in are recorded.

In step 849, whether there is a defect in the target block N in which the data for writing in are recorded is determined based on the outcome of the verifying process. When a defect is detected, the decision herein is set affirmative so that the process shifts to step 851.

In steps 851 and 853, the same process as in steps 651 and 653 is performed. Then, the process shifts to step 855.

It is noted that, in step 849 as described above, when a defect is not detected, the decision in step 849 is set negative so that the recording process is terminated.

Moreover, in step 845 as described above, when the recording of the data for writing in is not terminated successfully, the decision in step 845 is set negative so that the process shifts to step 851.

Furthermore, in step 803 as described above, when the user request is for recording per ECC block, the decision in step 803 is set negative so that the process shifts to step 843.

(Reproducing Process)

Figure 14:
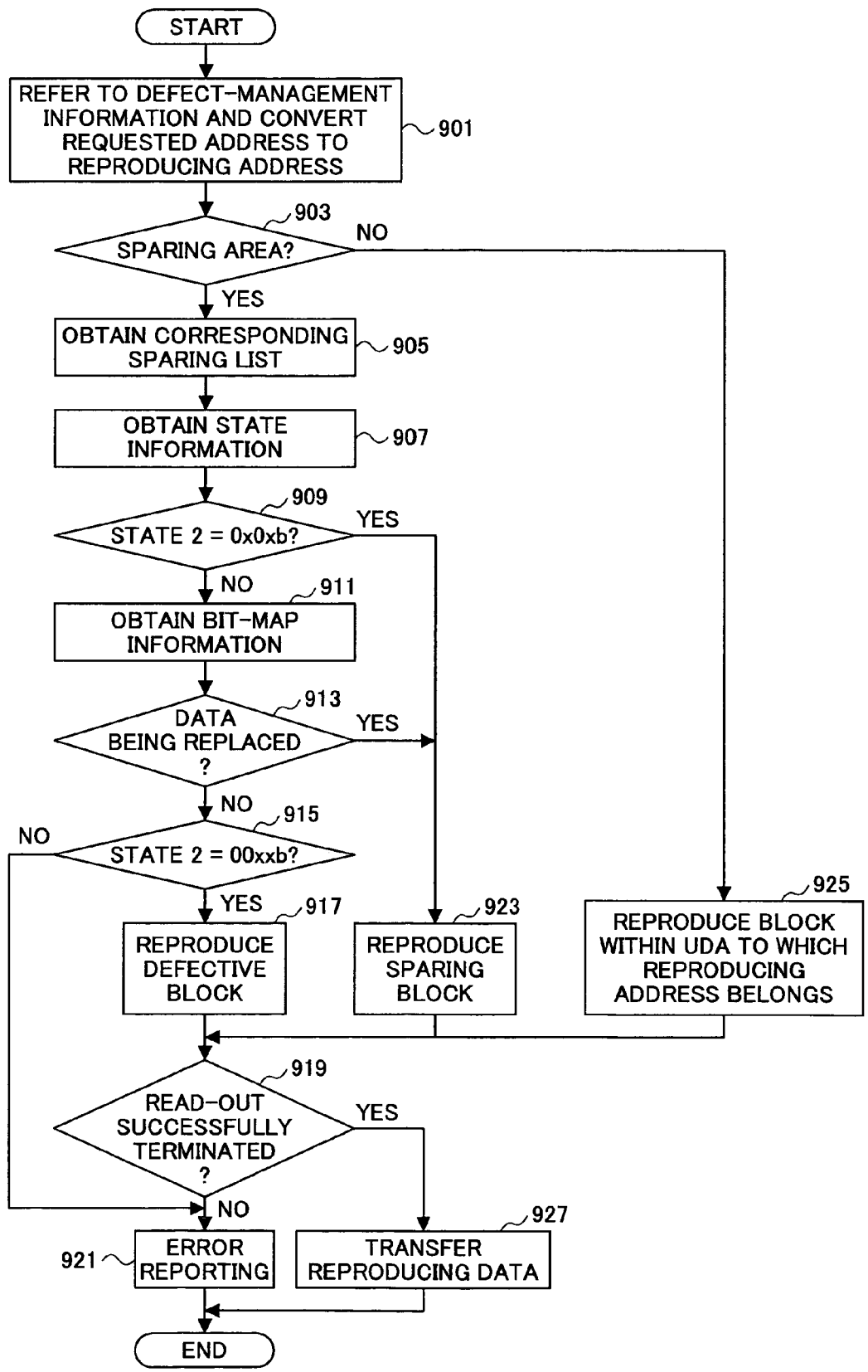
FIG. 14 is a flowchart for describing a reproducing process in the variation 1 of the second embodiment.

Next, a process when the optical-disk apparatus 20 receives from the upper-level apparatus 90 a command for reproducing is described using FIG. 14. The flowchart in FIG. 14 corresponds to a series of process algorithms executed by the CPU 40. It is assumed that, as an example, a request for reproducing from a user is made on a sector-by-sector basis.

The optical-disk apparatus receives from the upper-level apparatus 90 a command requesting for reproducing, which causes a starting address of a program (below called "a third reproducing-process program") corresponding to the flowchart in FIG. 14 to be set to the program counter of the CPU 40 so that the reproducing process is started.

In step 901, similar to step 701, the requested address is converted to the reproducing address.

In step 903, whether the reproducing address is included in the sparing area is determined. When the reproducing address is included in the sparing area, the decision herein is set affirmative so that the process shifts to step 905.

In steps 905 and 907, the same process as in the steps 705 and 707 is performed.

In step 909, whether the state 2 is "0x0xb" is determined. When the state 2 is not "0x0xb", the decision herein is set negative so that the process shifts to step 911.

In step 911, bit-map information is obtained from the corresponding sparing list.

In step 913, the bit-map information is referred to so that whether data are replaced in a sector indicated by the reproducing address is determined. When a flag corresponding to the sector indicated by the reproducing address is "1", the decision herein is set negative so that the process shifts to step 915.

In step 915, whether the state 2 is "00xxb" is determined. When the state 2 is not "00xxb", the decision herein is set affirmative so that the process shifts to step 917.

In step 917, data are reproduced for a defective block corresponding to a block to which the reproducing address belongs (a sparing block).

In step 919, whether reading out is successfully terminated is determined. When the reading out is terminated successfully, the decision herein is set affirmative so that the process shifts to step 927.

In step 927, the reproducing data are transferred to the upper-level apparatus 90 on a sector-by-sector basis. Then, the reproducing process is terminated.

It is noted that, in step 919 as described above, when the reading out is not terminated successfully, the decision in step 919 is set negative so that the process shifts to step 921. In step 921, an error is reported to the user. Then, the reproducing process is terminated.

In step 915 as described above, when the state 2 is not "00xxb", the decision in step 915 is set negative so that the process shifts to step 921. In other words, as the area in which data of an unreplaced portion are stored does not match a defective block, an error is reported to the user.

In step 913 as described above, when a flag corresponding to the sector indicated by the reproducing address is "0", the decision herein is set affirmative so that the process shifts to step 923. In step 923, the block to which the reproducing address belongs (the sparing block) is reproduced. Then, the process shifts to step 919.

Moreover, in step 909 as described above, when the state 2 is "0x0xb", the decision in step 909 is set affirmative so that the process shifts to step 923. In other words, a block to which the reproducing address belongs (a sparing block) is set as a block to be reproduced as all the data are replaced with the sparing block.

Furthermore, in step 903 as described above, when the reproducing address is not included in the sparing area, the decision in step 903 is set negative so that the process shifts to step 925. In step 925, a block to which the reproducing address belongs (a block within the UDA) is reproduced. Then the process shifts to step 919.

(Variation 2)

Figure 15A:
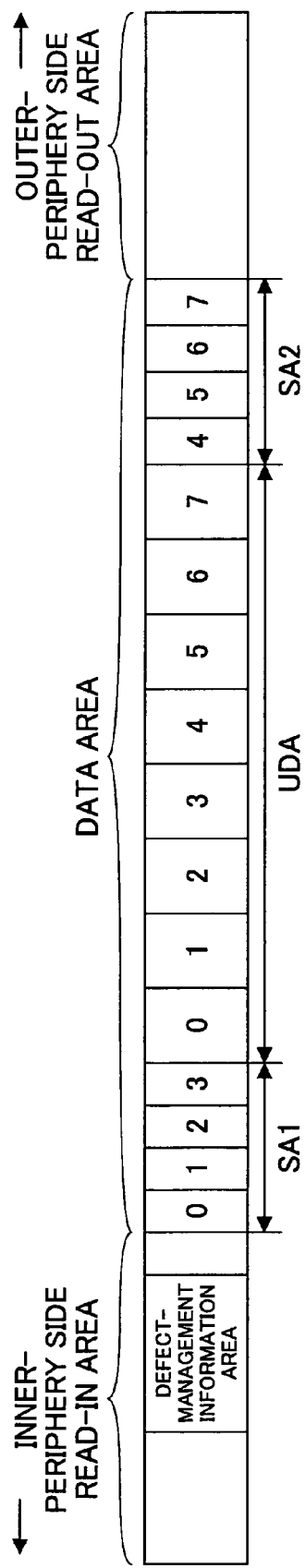
FIG. 15A is a first part of a figure for describing a variation 2 of the second embodiment.
Figure 15B:
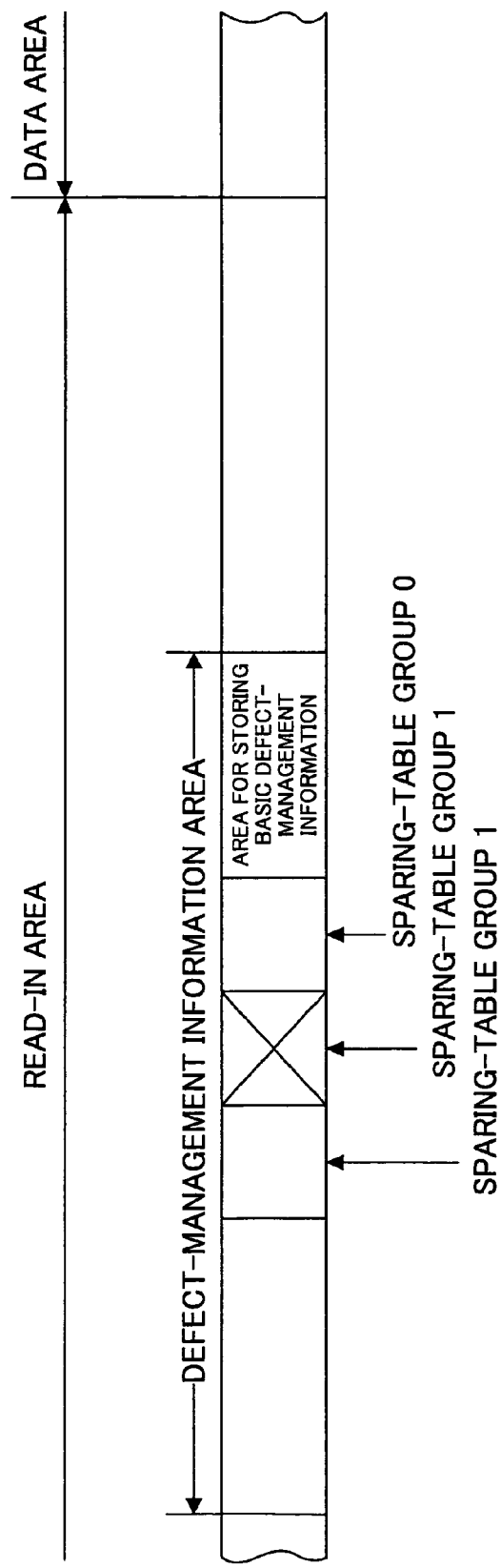
FIG. 15B is another first part of the figure for describing the variation 2 of the second embodiment.
Figure 15C:
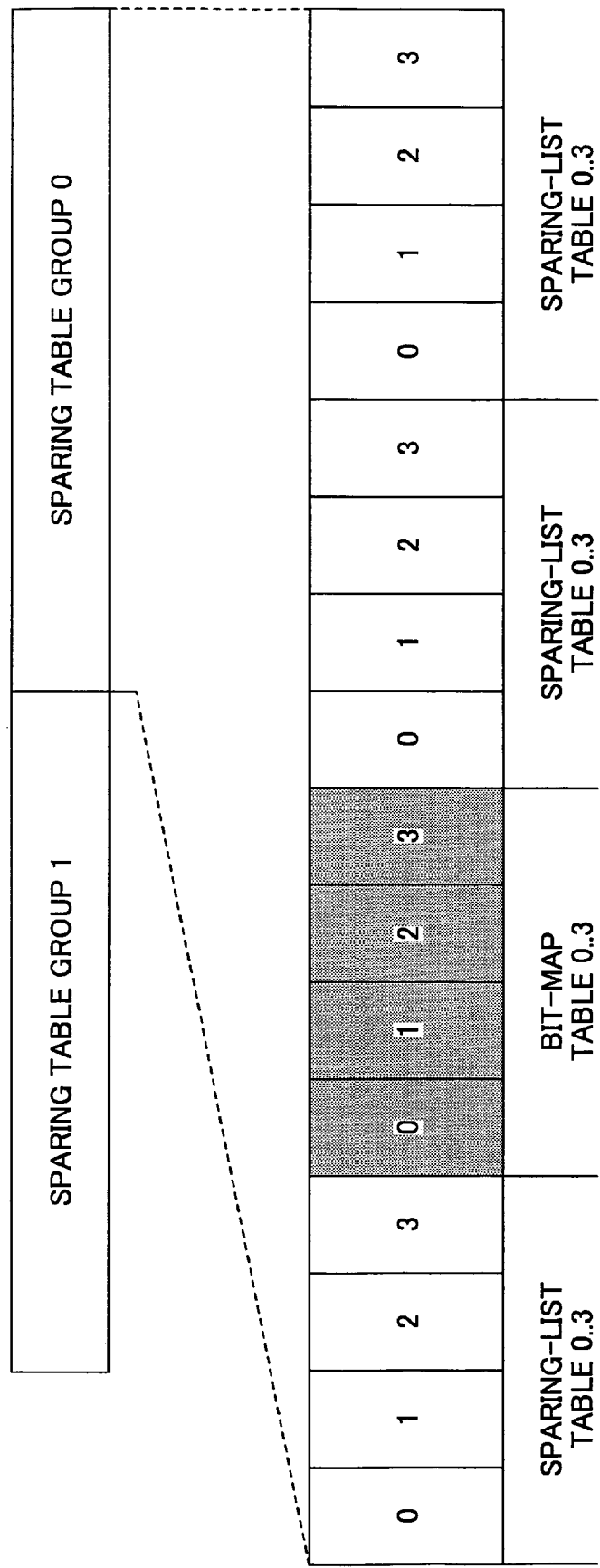
FIG. 15C is yet another first part of the figure for describing the variation 2 of the second embodiment.

Below a variation 2 of the second embodiment as described above is described using FIGS. 15A through 16B. As illustrated as an example in FIG. 15A, a User-Data Area (UDA) and a Sparing Area (SA1 and SA2) are each divided physically (or virtually) into eight partial areas so that defect management can be performed per respectively corresponding partial areas (a partial UDA and a partial SA). As illustrated in FIG. 15B, the defect-management information area in the present variation is composed of "an area for storing basic defect-management information" and multiple "sparing-table groups". Moreover, the structure of the sparing-table group is illustrated in FIG. 15C. The sparing-table group includes multiple "sparing-list tables" and multiple "bit-maps". In the present variation, as described above, the UDA is divided into eight partial areas so that information per partial area is stored in the sparing-list table. The data structure of this sparing-list table is described below. The sparing-block group consists of predetermined blocks and, within each sparing-table group, four sparing-list tables are stored. Moreover, information of the sparing-list table is recorded repeatedly within the sparing-table group. In the present variation, there are two sparing-table groups (a sparing-table group 0 and a sparing-table group 1). Moreover, the sparing-table group stores corresponding bit-map information per partial area (partial SA).

FIG. 16A represents major portions of the basic defect-management information. This basic defect-management information includes "an identifying ID", "a version number", "the update count", "a SA1 size", "a partial-UDA size", "a SA2 size", "the number of sparing-table groups", "position information on sparing-table group 0", "position information on sparing-table group 1", etc. In the "identifying ID", ID information indicating that the information is basic defect-management information is stored. In the "version number", a version number of the basic defect-management information is stored. In "the update count", the number of times the defect-management information is updated (recorded) is stored. Moreover, in "the SA 1 size", the size of the SA1 is stored. In "the partial-UDA size", the size of each of the partial UDAs which are made by physically (or virtually) dividing the UDA into multiple partial areas is stored. In "the SA 2 size", the size of the SA2 is stored. Furthermore, in "the number of sparing-table groups", the number of sparing-table groups existing on the disk is stored. In the "position information on the sparing-table group 0", information regarding an area in which the sparing-table group 0 is recorded is stored. In the "position information on the sparing-table group 1", information regarding an area in which the sparing-table group 1 is recorded is stored.

FIG. 16B represents major portions of the sparing-list table. This sparing-list table has "an identifying ID", "a sparing-list table number", "the update count", "the number of sparing lists", "a pointer for storing an unused sparing list", "a pointer for storing a defective sparing list", "a defective-block address 1", "a defective-block address 2", "an unused sparing-block address 1", "an unused sparing-block address 2" as well as "bit-map position information", "a bit-map size", "a bit-map block address", and "a sparing list 1" through "a sparing list n", etc. In the "identifying ID", ID information indicating that the information is a sparing-list table is stored, while in "the sparing-list table number", a number of the sparing-list table is stored. It is noted that a corresponding partial area can be specified from this sparing-list table number. In "the update count", the number of times the sparing-list table is updated (recorded) is stored, while in "the number of sparing lists", the number of sparing lists stored within the sparing-list table is stored. Herein it is assumed that n sparing lists exist. In "the pointer for storing an unused sparing list", position information on where a first sparing list out of sparing lists which are unused (not used for replacing) stored in the sparing-list table is stored as the number of bytes from the start of the sparing-list table. In "the pointer for storing a defective sparing list", position information on where a first sparing list out of defective sparing lists stored in the sparing-list table is stored as the number of bytes from the start of the sparing-list table. In "the defective-block address 1", address information on a defective block having the smallest address out of defective blocks managed within the sparing-list table is stored. In "the defective-block address 2", address information on a defective block having the largest address out of defective blocks managed within the sparing-list table is stored. In "the unused sparing-block address 1", address information on a sparing block having the smallest address out of unused sparing blocks managed within the sparing-list table (an ECC block not used in replacing out of ECC blocks within a sparing area) is stored. In "the unused sparing-block address 2", address information on a sparing block having the largest address out of unused sparing blocks managed within the sparing-list table is stored. In the "bit-map position information", address information of an area in which bit-map information managed by the sparing-list table is being recorded is stored. In "the bit-map size", the size (the number of bytes) of a valid bit map out of the bit-map area is stored. In "the bit-map block address", the starting address of a sparing area corresponding to a partial area managed by the bit-map area is stored. Moreover, in the respective "sparing list 1" through "sparing list n", a corresponding relationship between an address of a defective block and an address of a sparing block is stored.

The present application is based on the Japanese Priority Application No. 2004-068431 filed on Mar. 11, 2004 and Internal Priority Application No. 2004-110698 filed on Apr. 5, 2004, the entire contents of which are hereby incorporated by reference.

The invention claimed is:

1. A method of defect management for managing on a block-by-block basis a defective area in an information-recording medium having a user-data area, a sparing area, and a defect-management information area, the block being of a predetermined size, when a defective block in which the defective area is included is set to be replaced with a sparing block of said sparing area, comprising the steps of:
dividing said sparing block into a plurality of subblocks so as to set identifying information, for identifying one of the sparing subblocks in which data are replaced and a non-sparing subblock in which data are not replaced, as defect-management information; and
setting block-management information, including information regarding said defective block and said sparing block, and information regarding an area in which non-sparing data not replaced with said sparing block are stored, as defect-management information.

2. The method of defect management as claimed in claim 1, further comprising the step of: storing said block-management information and said identifying information in said information-recording medium.

3. A computer program stored on a non-transitory recording medium for use in an information-reproducing apparatus for reproducing data from the information-recording medium in which defect management is performed with the method of defect management as claimed in claim 1, causing a computer for controlling of said information-reproducing apparatus, when a reproducing address represents the non-sparing subblock in the sparing block, to execute the program comprising the step of:
determining a block to be reproduced based on the block-management information set in said defect management.

4. A method of reproduction for reproducing data from the information-recording medium in which defect management is performed with the method of defect management as claimed in claim 1, when a reproducing address represents the non-sparing subblock in the sparing block, further comprising the step of:
determining a block to be reproduced based on the block-management information set in said defect management.

5. The method of reproduction as claimed in claim 4, wherein said determining step determines, based on address information of the area in which the non-sparing data not replaced with said sparing block is stored, the block to be reproduced.

6. The method of reproduction as claimed in claim 4, wherein said determining step determines, when the area in which the non-sparing data that is not replaced with said sparing block is stored belongs to the user-data area, a defective block corresponding to said sparing block as the block to be reproduced.

7. The method of reproduction as claimed in claim 4, wherein:
said block-management information includes information that the area in which the non-sparing data are stored cannot be specified; and
said determining step determines, when the area in which the non-sparing data not replaced with said sparing block are stored cannot be specified, that the block to be reproduced is unknown.

8. The method of reproduction as claimed in claim 4, wherein:
multiple sets of the block-management information are stored in the defect-management information area of said information-recording medium, the respective block-management information sets including information as to whether the sparing block is defective; and
said determining step extracts out of said multiple block-management information sets one of the block-management information sets, having the same defective block address as an address of a defective block corresponding to a sparing block to which said reproducing address belongs and in which the sparing block is defective, so as to determine the block to be reproduced based on the extracted block-management information.

9. The method of reproduction as claimed in claim 8, wherein said determining step, when the number of said extracted block-management information sets is one, determines the sparing block in the one block-management information set as the block to be reproduced.

10. The method of reproduction as claimed in claim 8, wherein said determining step, when multiple of said extracted block-management information sets exists, determines that the block to be reproduced is unknown.

11. The method of reproduction as claimed in claim 4, wherein:
said block-management information includes information as to whether the area in which the non-sparing data are stored is a defective block corresponding to a sparing block; and
said determining step, when the area in which the non-sparing data not replaced with said sparing block is a defective block corresponding to said sparing block, determines the defective block corresponding to said sparing block as the block to be reproduced.

12. The method of reproduction as claimed in claim 4, wherein:
said block-management information includes information as to whether the area in which the non-sparing data are stored is a defective block corresponding to a sparing block; and
said determining step, when the area in which the non-sparing data not replaced with said sparing block is not a defective block that corresponds to said sparing block, determines that the block to be reproduced is unknown.

13. A computer program stored on a non-transitory recording medium for use in an information-recording apparatus for recording data in an information-recording medium having a user-data area, a sparing area, and a defect-management information area, the sparing area being managed on a block-by-block basis, the block being of a predetermined size, causing a computer for controlling said information-recording apparatus to execute, when a defective block in which the defective area is included is set to be replaced with a sparing block of said sparing area, the program comprising the steps of:
dividing said sparing block into a plurality of subblocks so as to set identifying information for identifying one of the sparing subblocks in which data are replaced and a non-sparing subblock in which data are not replaced as defect-management information; and setting block-management information, including information regarding said defective block and said sparing block, and information regarding an area in which non-sparing data not replaced with said sparing block are stored, as defect-management information.

14. The computer program stored on a non-transitory recording medium as claimed in claim 13, further causing said computer for controlling to execute the step of storing said block-management information and said identifying information in said information-recording medium.

15. An apparatus for information recording for recording data in an information-recording medium having a user-data area, a sparing area, and a defect-management information area, a defective area being managed on a block-by-block basis, the block being of a predetermined size, the apparatus comprising:
replacing means for replacing a defective block in which the defective area is included, with a sparing block of said sparing area;
identifying-information setting means for dividing said sparing block into a plurality of subblocks so as to set identifying information, for identifying one of the sparing subblocks in which data are replaced and a non-sparing subblock in which data are not replaced, as defect-management information; and
management-information setting means for setting block-management information, including information regarding said defective block and said sparing block, and information regarding an area in which non-sparing data not replaced with said sparing block are stored, as defect-management information.

16. The apparatus for information recording as claimed in claim 15, wherein the management-information setting means sets, as the information regarding the area in which said non-sparing data are stored, address information of the area in which said non-sparing data are stored.

17. The apparatus for information recording as claimed in claim 15, wherein, when said defective block belongs to said sparing area and data in said defective block are partially replaced, said management-information setting means sets, as said address information, dummy address-information indicating that the area in which said non-sparing data are stored cannot be specified.

18. The apparatus for information recording as claimed in claim 15, wherein said management-information setting means sets, as information regarding the area storing said non-sparing data, information regarding an area in which said area storing said non-sparing data.

19. The apparatus for information recording as claimed in claim 18, wherein, when said defective block belongs to said user-data area and data of said defective block are set to be partially replaced, said management-information setting means sets information indicating that said area in which said area storing said non-sparing data belongs is said user-data area.

20. The apparatus for information recording as claimed in claim 18, wherein, when said defective block belongs to said sparing area and in the defective block all data are replaced, and data of said defective block are partially replaced, said management-information setting means sets information indicating said area in which said area storing said non-sparing data belongs is said sparing area.

21. The apparatus for information recording as claimed in claim 18, wherein, when said defective block belongs to said sparing area and data in said defective block are partially replaced, said management-information setting means sets information indicating said area in which said area storing said non-sparing data belongs cannot be specified.

22. The apparatus for information recording as claimed in claim 18, wherein:
multiple sets of the block-management information are stored in the defect-management information area, the respective block-management information sets including information as to whether the sparing block is defective; and
when said defective block belongs to said sparing area and in the defective block all data are replaced, and data of said defective block are partially replaced, said management-information setting means further changes to a dummy address a defective block address in, out of said multiple block-management information sets, a block-management information set having the same defective block address as an address of said defective block and in which the sparing block is defective.

23. The apparatus for information recording as claimed in claim 18, wherein said management-information setting means further sets, as said block-management information, information indicating as to whether said area storing said non-sparing data is the defective block corresponding to said sparing block.

24. The apparatus for information recording as claimed in claim 23, wherein said management-information setting means, when partially replacing data within said user-data area, sets the information indicating that said area storing said non-sparing data is the defective block corresponding to said sparing block.

25. The apparatus for information recording as claimed in claim 23, wherein said management-information setting means, when partially replacing data within said sparing area, sets the information indicating that said area storing said non-sparing data is not the defective block corresponding to said sparing block.

26. The apparatus for information recording as claimed in claim 15, further comprising information-storing means for storing said block-management information and said identifying information in said information-recording medium.

27. The apparatus for information recording as claimed in claim 26, wherein said information-storing means stores said block-management information and said identifying information in said defect-management area.

28. An apparatus for information reproduction-for reproducing data from the information-recording medium in which defect management is performed with the method of defect management as claimed in claim 1, when a reproducing address represents the non-sparing subblock in the sparing block, comprising:
determining means for determining, based on block-management information which is set in said defect management, a block to be reproduced; and
a processing apparatus for processing according to said determining.

29. The apparatus for information reproduction as claimed in claim 28, wherein said determining means determines the block to be reproduced based on address information of the area in which the non-sparing data not replaced with said sparing block are stored.

30. The apparatus for information reproduction as claimed in claim 29, wherein:
said block-management information includes information indicating that the area in which the non-sparing data not replaced with said sparing block are stored cannot be specified; and
said determining means, when the area in which the non-sparing data not replaced with said sparing block are stored cannot be specified, determines that the block to be reproduced is unknown, and wherein the processing apparatus reports an error.

31. The apparatus for information reproduction as claimed in claim 28, wherein said determining means, when the area in which the non-sparing data that is not replaced with said sparing block is stored belongs to the user-data area, determines the defective block corresponding to said sparing block as the block to be reproduced.

32. The apparatus for information reproduction as claimed in claim 28, wherein:
multiple sets of the block-management information are stored in the defect-management information area of said information-recording medium, the respective block-management information sets including information as to whether the sparing block is defective;
said determining means extracts out of said multiple block-management information sets one of the block-management information sets, having the same defective block address as an address of a defective block corresponding to a sparing block to which said reproducing address belongs and in which the sparing block is defective, so as to determine the block to be reproduced based on the extracted block-management information.

33. The apparatus for information reproduction as claimed in claim 32, wherein said determining means, when the number of said extracted block-management information sets is one, determines the sparing block included in the block-management information set as the block to be reproduced.

34. The apparatus for information reproduction as claimed in claim 32, wherein:
said determining means, when multiple of said extracted block-management information sets exists, determines that the block to be reproduced is unknown; and
said processing apparatus reports an error.

35. The apparatus for information reproduction as claimed in claim 28, wherein:
said block-management information includes information as to whether the area in which the non-sparing data are stored is a defective block corresponding to a sparing block; and
said determining means, when the area in which the non-sparing data not replaced with said sparing block corresponds to said sparing block, determines the defective block corresponding to said sparing block as the block to be reproduced.

36. The apparatus for information reproduction as claimed in claim 28, wherein:
said block-management information includes information as to whether the area in which the non-sparing data are stored is a defective block corresponding to a sparing block;
said determining means, when the area in which the non-sparing data not replaced with said sparing block is not a defective block corresponding to said sparing block, determines that the block to be reproduced is unknown; and
said processing apparatus reports an error.

* * * * *